US012791802B2

(12) United States Patent
Huang et al.

(10) Patent No.: US 12,791,802 B2
(45) Date of Patent: Nov. 10, 2026

(54) OPTICAL DEVICE STRUCTURE AND METHOD FOR FORMING THE SAME

(71) Applicant: Taiwan Semiconductor Manufacturing Company, Ltd., Hsinchu (TW)

(72) Inventors: Chien-Yuan Huang, Hsinchu (TW); Shih-Chang Ku, Taipei City (TW); Chen-Hua Yu, Hsinchu City (TW); Chuei-Tang Wang, Taichung City (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 589 days.

(21) Appl. No.: 18/366,308

(22) Filed: Aug. 7, 2023

(65) Prior Publication Data

US 2025/0052963 A1 Feb. 13, 2025

(51) Int. Cl.
*G02B 6/42* (2006.01)
*G02B 6/43* (2006.01)

(52) U.S. Cl.
CPC ......... *G02B 6/4268* (2013.01); *G02B 6/4239* (2013.01); *G02B 6/424* (2013.01); *G02B 6/4248* (2013.01); *G02B 6/4266* (2013.01); *G02B 6/43* (2013.01)

(58) Field of Classification Search
CPC ................................ G02B 6/30; G02B 6/4214
See application file for complete search history.

(56) References Cited

U.S. PATENT DOCUMENTS 10,025,043 B2 * 7/2018 Vallance ................ G02B 6/124
11,029,475 B2 * 6/2021 Patel .................... G02B 6/4246
2003/0068141 A1 * 4/2003 Velsher ................ G02B 6/4251 385/88
2015/0362683 A1 * 12/2015 Yan ........................ G02B 6/425 385/89
2018/0203187 A1 * 7/2018 Doerr ........................ G02B 6/12
2021/0109292 A1 * 4/2021 Takano ................ G02B 6/3636
2022/0196929 A1 * 6/2022 Toda .................... G02B 6/4204
2023/0152546 A1 * 5/2023 Matiss ................. G02B 6/4455 385/135
2023/0251428 A1 * 8/2023 Schaevitz ............. G02B 6/322 385/33

* cited by examiner

*Primary Examiner* — Michelle R Connelly
(74) *Attorney, Agent, or Firm* — McClure, Qualey & Rodack, LLP

(57) ABSTRACT

A method for forming an optical device structure is provided. The method includes disposing a first end portion of an optical fiber into a fiber array unit structure. The first end portion penetrates through the fiber array unit structure. The method includes bonding the first end portion of the optical fiber to a co-packaged optical device. The method includes bonding a fiber shield structure to the fiber array unit structure and the co-packaged optical device after the first end portion is bonded to the co-packaged optical device. The fiber shield structure surrounds the optical fiber.

20 Claims, 22 Drawing Sheets

OPTICAL DEVICE STRUCTURE AND METHOD FOR FORMING THE SAME

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semiconductor layers over a semiconductor substrate, and patterning the various material layers using lithography to form circuit components and elements.

Dozens or hundreds of integrated circuits are typically manufactured on a single semiconductor wafer. The individual dies are singulated by sawing the integrated circuits along scribe lines. The individual dies are then packaged separately. The semiconductor industry continues to improve the integration density of various electronic components (e.g., transistors, diodes, resistors, capacitors, etc.) by continual reductions in minimum feature size, which allow more components to be integrated into a given area. However, since the more components there are, the greater the heat generation, the stability and the heat dissipation of the components become an important issue. The components may be used to form an optical device structure.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, the dimensions of the various features may be arbitrarily increased or reduced for clarity of discussion.

DETAILED DESCRIPTION

Figure 1A:
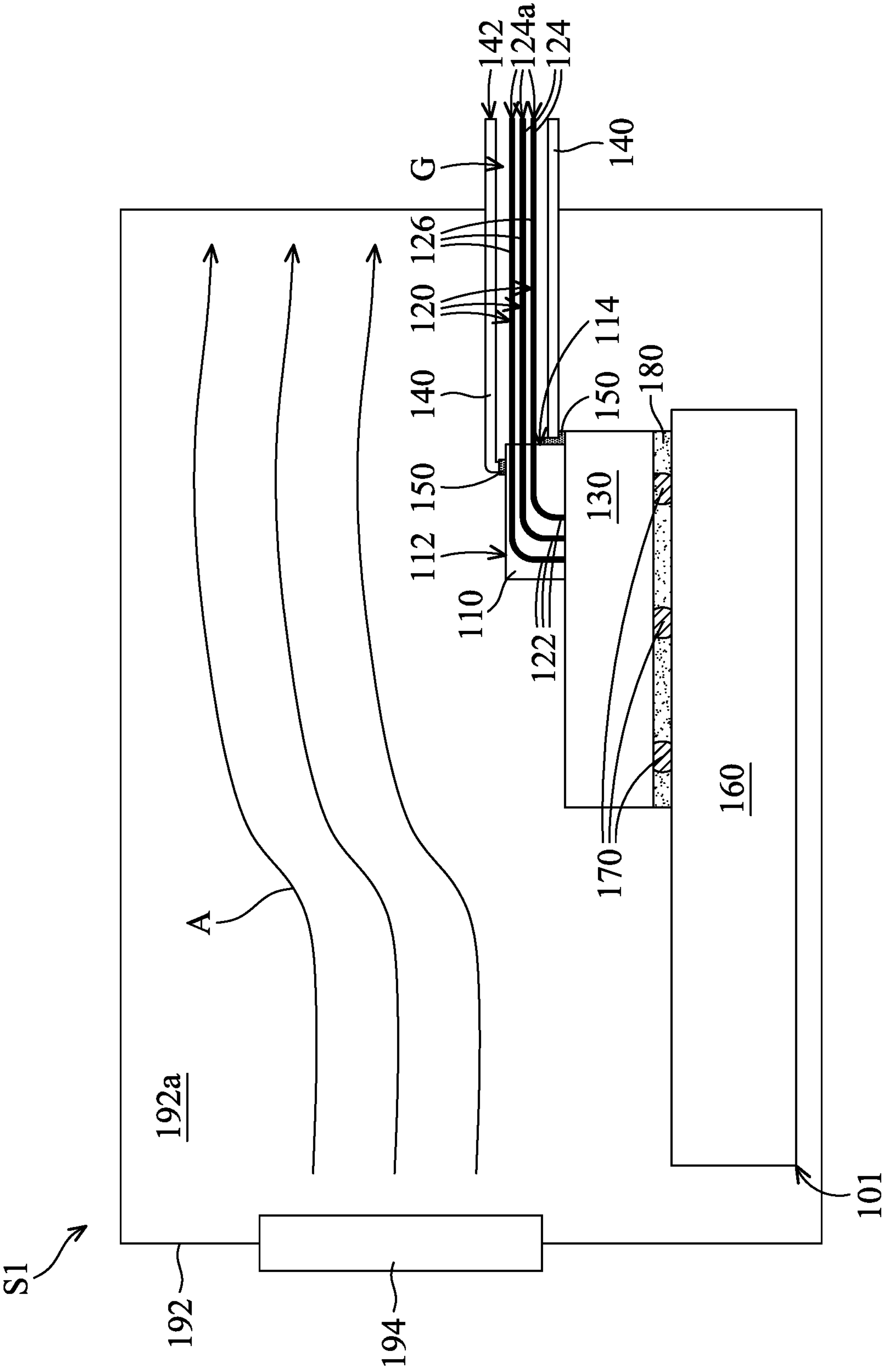
FIG. 1A is a cross-sectional view of a server, in accordance with some embodiments.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "substantially" in the description, such as in "substantially flat" or in "substantially coplanar", etc., will be understood by the person skilled in the art. In some embodiments the adjective substantially may be removed. Where applicable, the term "substantially" may also include embodiments with "entirely", "completely", "all", etc. The term "substantially" may be varied in different technologies and be in the deviation range understood by the skilled in the art. For example, the term "substantially" may also relate to 90% of what is specified or higher, such as 95% of what is specified or higher, especially 99% of what is specified or higher, including 100% of what is specified, though the present invention is not limited thereto. Furthermore, terms such as "substantially parallel" or "substantially perpendicular" may be interpreted as not to exclude insignificant deviation from the specified arrangement and may include for example deviations of up to 10°. The word "substantially" does not exclude "completely" e.g. a composition which is "substantially free" from Y may be completely free from Y.

The term "about" may be varied in different technologies and be in the deviation range understood by the skilled in the art. The term "about" in conjunction with a specific distance or size is to be interpreted so as not to exclude insignificant deviation from the specified distance or size. For example, the term "about" may include deviations of up to 10% of what is specified, though the present invention is not limited thereto. The term "about" in relation to a numerical value x may mean x+5 or 10% of what is specified, though the present invention is not limited thereto.

Some embodiments of the disclosure are described. Additional operations can be provided before, during, and/or after the stages described in these embodiments. Some of the stages that are described can be replaced or eliminated for different embodiments. Additional features can be added to the optical device structure. Some of the features described below can be replaced or eliminated for different embodiments. Although some embodiments are discussed with operations performed in a particular order, these operations may be performed in another logical order.

FIG. 1A is a cross-sectional view of a server, in accordance with some embodiments. As shown in FIG. 1A, a fiber array unit structure 110 and optical fibers 120 are provided, in accordance with some embodiments. In some embodiments, end portions 122 of the optical fibers 120 are disposed into the fiber array unit structure 110.

The end portions 122 penetrate through the fiber array unit structure 110, in accordance with some embodiments. The fiber array unit structure 110 is used to fix the position of the optical fibers 120, in accordance with some embodiments. The optical fibers 120 are made of glass (e.g., silica glass) or an optical-grade plastic (e.g., polymethylmethacrylate), in accordance with some embodiments.

Figure 1B:
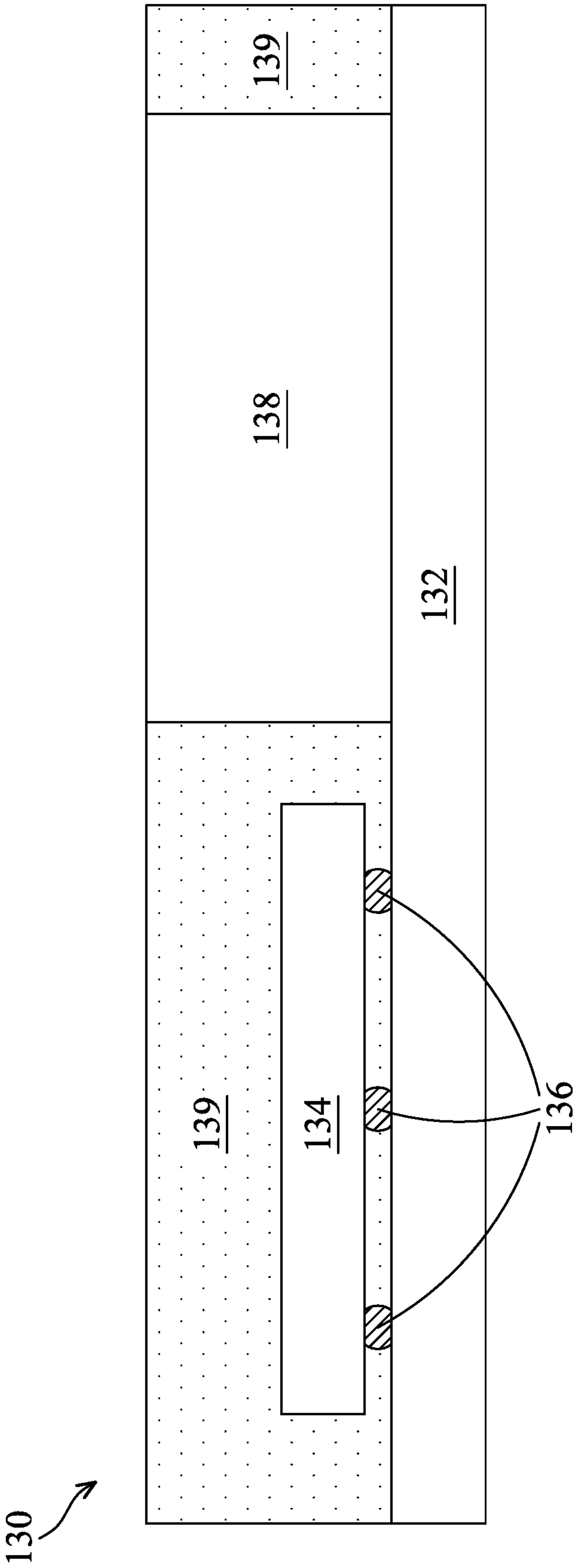
FIG. 1B is a cross-sectional view of a co-packaged optical device of the optical device structure of FIG. 1A, in accordance with some embodiments.

As shown in FIG. 1A, a co-packaged optical device 130 is provided, in accordance with some embodiments. FIG. 1B is a cross-sectional view of a co-packaged optical device of the optical device structure of FIG. 1A, in accordance with some embodiments. As shown in FIGS. 1A and 1B, the co-packaged optical device 130 includes, for example, a wiring substrate 132, a chip 134, conductive connectors 136, an optical module 138, and a molding layer 139, in accordance with some embodiments.

The wiring substrate 132 includes wiring layers (not shown), conductive vias (not shown), a dielectric layer (not shown), and bonding pads (not shown), in accordance with some embodiments. The wiring layers and the conductive vias are formed in the dielectric layer, in accordance with some embodiments.

The bonding pads are over the dielectric layer, in accordance with some embodiments. The conductive vias are electrically connected between different wiring layers and between the wiring layers and the bonding pads, in accordance with some embodiments.

The dielectric layer is made of an insulating material such as a polymer material (e.g., polybenzoxazole, polyimide, or a photosensitive material), nitride (e.g., silicon nitride), oxide (e.g., silicon oxide), silicon oxynitride, or the like, in accordance with some embodiments.

The dielectric layer is formed using deposition processes (e.g. chemical vapor deposition processes or physical vapor deposition processes), photolithography processes, and etching processes, in accordance with some embodiments.

The wiring layers are made of a conductive material, such as metal (e.g. copper, aluminum, or tungsten) or alloys thereof, in accordance with some embodiments. The conductive vias are made of a conductive material, such as metal (e.g. copper, aluminum, or tungsten) or alloys thereof, in accordance with some embodiments. The conductive pads are made of a conductive material, such as metal (e.g. copper, aluminum, or tungsten) or alloys thereof, in accordance with some embodiments.

In some embodiments, the conductive pads, the wiring layers, and the conductive vias are made of the same material. In some other embodiments, the conductive pads, the wiring layers, and the conductive vias are made of different materials.

The chip 134 is bonded to the conductive pads of the wiring substrate 132 through the conductive connectors 136, in accordance with some embodiments. The chip 134 includes a semiconductor substrate and an interconnect structure over the semiconductor substrate, in accordance with some embodiments. In some embodiments, the semiconductor substrate is made of an elementary semiconductor material including silicon or germanium in a single crystal structure, a polycrystal structure, or an amorphous structure.

In some other embodiments, the semiconductor substrate is made of a compound semiconductor, such as silicon carbide, gallium arsenide, gallium phosphide, indium phosphide, indium arsenide, an alloy semiconductor, such as SiGe, or GaAsP, or a combination thereof. The semiconductor substrate may also include multi-layer semiconductors, semiconductor on insulator (SOI) (such as silicon on insulator or germanium on insulator), or a combination thereof.

In some embodiments, the semiconductor substrate includes various device elements. In some embodiments, the various device elements are formed in and/or over the semiconductor substrate. The device elements are not shown in figures for the purpose of simplicity and clarity.

Examples of the various device elements include active devices, passive devices, other suitable elements, or a combination thereof. The active devices may include transistors or diodes (not shown) formed at a surface of the semiconductor substrate. The active devices include central processing unit devices, field-programmable gate array devices, memory devices, or the like, in accordance with some embodiments. The passive devices include resistors, capacitors, or other suitable passive devices.

For example, the transistors may be metal oxide semiconductor field effect transistors (MOSFET), complementary metal oxide semiconductor (CMOS) transistors, bipolar junction transistors (BJT), high-voltage transistors, highfrequency transistors, p-channel and/or n-channel field effect transistors (PFETs/NFETs), etc.

Various processes, such as front-end-of-line (FEOL) semiconductor fabrication processes, are performed to form the various device elements. The FEOL semiconductor fabrication processes may include deposition, etching, implantation, photolithography, annealing, planarization, one or more other applicable processes, or a combination thereof.

In some embodiments, isolation features (not shown) are formed in the semiconductor substrate. The isolation features are used to define active regions and electrically isolate various device elements formed in and/or over the semiconductor substrate in the active regions. In some embodiments, the isolation features include shallow trench isolation (STI) features, local oxidation of silicon (LOCOS) features, other suitable isolation features, or a combination thereof.

The conductive connectors 136 are used to electrically connected between the wiring substrate 132 and the chip 134, in accordance with some embodiments. The conductive connectors 136 are made of a conductive material such as copper (Cu), aluminum (Al), tungsten (W), cobalt (Co), nickel (Ni), or tin (Sn), in accordance with some embodiments. The conductive connectors 136 are formed using a plating process such as an electroplating process, in accordance with some embodiments.

The optical module 138 is bonded to the wiring substrate 132, in accordance with some embodiments. The optical module 138 is electrically connected to the wiring substrate 132, in accordance with some embodiments. The optical module 138 is electrically connected to the chip 134 through the wiring substrate 132, in accordance with some embodiments. The optical module 138 includes optical devices such as laser devices, modulators, photodetectors, or the like, in accordance with some embodiments.

The molding layer 139 is formed over the wiring substrate 132 and surrounds the chip 134, the conductive connectors 136, and the optical module 138, in accordance with some embodiments. The molding layer 139 is made of a polymer material, in accordance with some embodiments.

As shown in FIGS. 1A and 1B, the end portions 122 of the optical fibers 120 and the fiber array unit structure 110 are bonded to the optical module 138 of the co-packaged optical device 130, in accordance with some embodiments.

Figure 1C:
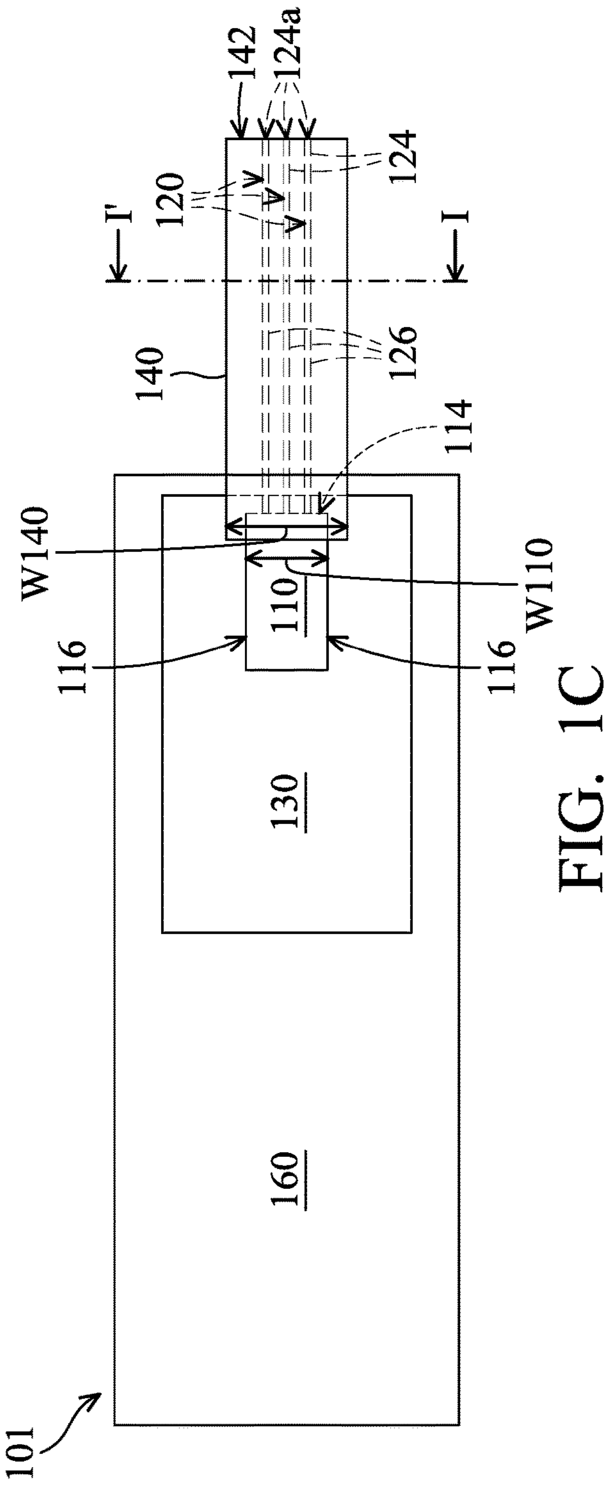
FIG. 1C is a top view of the optical device structure of FIG. 1A, in accordance with some embodiments.

FIG. 1C is a top view of the optical device structure of FIG. 1A, in accordance with some embodiments. As shown in FIGS. 1A and 1C, a fiber shield structure 140 is bonded to the fiber array unit structure 110 and the co-packaged optical device 130 through an adhesive layer 150, in accordance with some embodiments.

As shown in FIGS. 1A and 1C, main portions 126 of the optical fibers 120 are not covered by the fiber array unit structure 110, in accordance with some embodiments. The fiber shield structure 140 covers the main portions 126 of the optical fibers 120, in accordance with some embodiments.

The sidewalls 124*a* of the end portions 124 of the optical fibers 120 are substantially level with the sidewall 142 of the fiber shield structure 140, in accordance with some embodiments. The end portions 124 of the optical fibers 120 can be connected to other devices (not shown) in the subsequent process, in accordance with some embodiments.

Figure 1E:
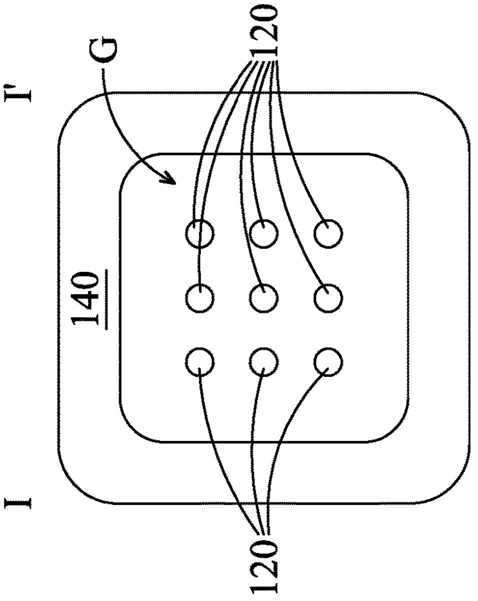
FIG. 1E is a cross-sectional view illustrating the optical fibers and the fiber shield structure along a sectional line I-I' in FIG. 1C, in accordance with some other embodiments.
Figure 1D:
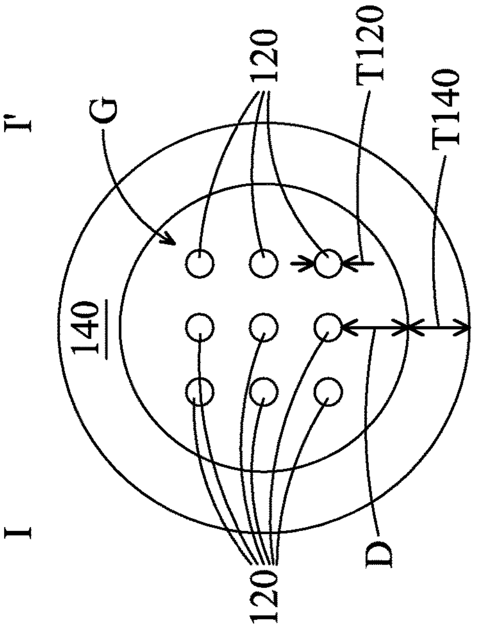
FIG. 1D is a cross-sectional view illustrating the optical fibers and the fiber shield structure along a sectional line I-I' in FIG. 1C, in accordance with some embodiments.

FIG. 1D is a cross-sectional view illustrating the optical fibers and the fiber shield structure along a sectional line I-I' in FIG. 1C, in accordance with some embodiments. As shown in FIG. 1D, the fiber shield structure 140 surrounds the optical fibers 120, in accordance with some embodiments. The fiber shield structure 140 is spaced apart from the optical fibers 120 by a gap G, in accordance with some embodiments.

The fiber shield structure 140 is thicker than the optical fibers 120, in accordance with some embodiments. That is, the thickness T140 of the fiber shield structure 140 is greater than the thickness T120 of the optical fiber 120, in accordance with some embodiments.

The thickness T140 ranges from about 0.1 mm to about 1 cm, in accordance with some embodiments. The thickness T120 ranges from about 200 μm to about 300 μm, in accordance with some embodiments. The ratio of the distance D between the optical fiber 120 and the fiber shield structure 140 to the thickness T120 ranges from about 1 to about 10, in accordance with some embodiments.

As shown in FIG. 1D, the fiber shield structure 140 has a round-like shape, in accordance with some embodiments. In some other embodiments, as shown in FIG. 1E, the fiber shield structure 140 has a square-like shape, in accordance with some embodiments. The shape of the fiber shield structure 140 can vary according to different design requirements.

Figure 1F:
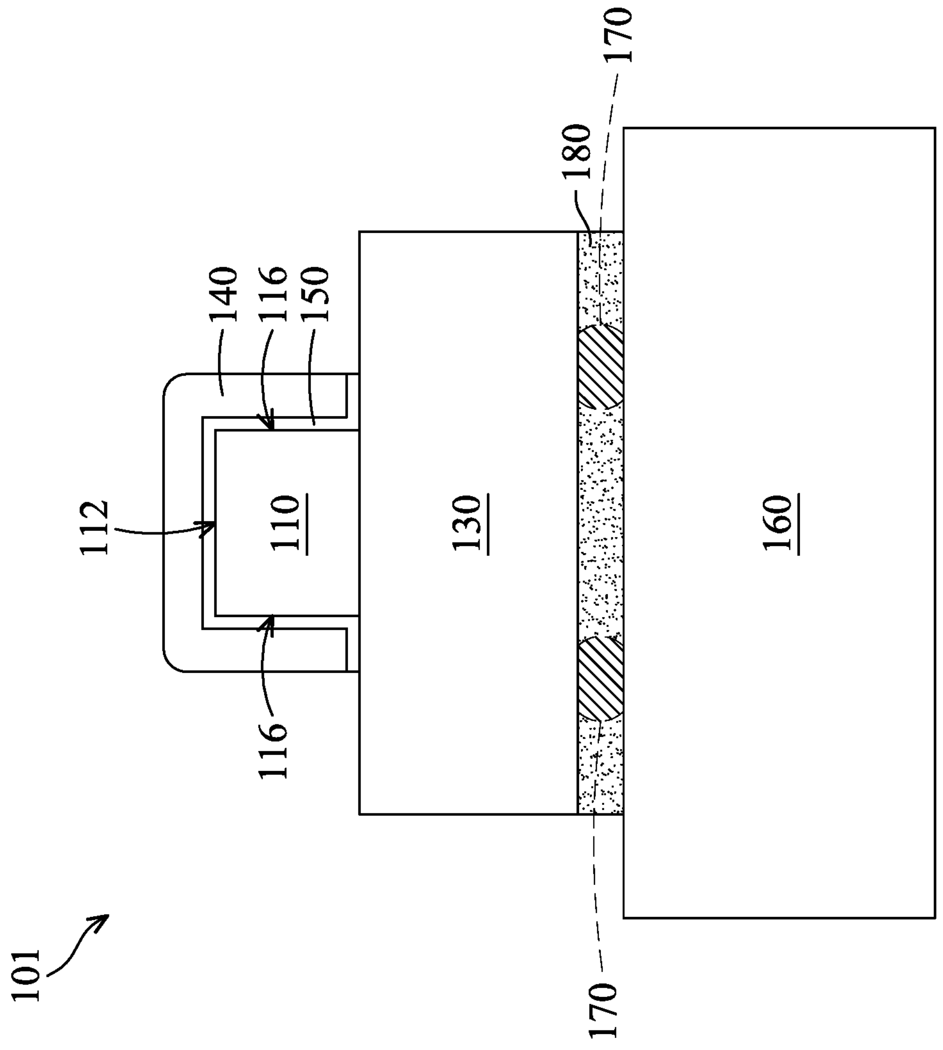
FIG. 1F is a side view of the optical device structure of FIG. 1A, in accordance with some embodiments.

FIG. 1F is a side view of the optical device structure of FIG. 1A, in accordance with some embodiments. As shown in FIGS. 1A, 1C, and 1F, the fiber shield structure 140 covers a portion of a top surface 112 of the fiber array unit structure 110 and portions of sidewalls 114 and 116 of the fiber array unit structure 110, in accordance with some embodiments.

The adhesive layer 150 is between the fiber shield structure 140 and the fiber array unit structure 110, in accordance with some embodiments. The adhesive layer 150 is also between the fiber shield structure 140 and the co-packaged optical device 130, in accordance with some embodiments.

The fiber shield structure 140 is made of metal (e.g., copper or aluminum) or another material which can sustain thermal or mechanical requirements, in accordance with some embodiments. The adhesive layer 150 is made of a polymer material, in accordance with some embodiments.

As shown in FIGS. 1A, 1C, and IF, the co-packaged optical device 130 is bonded to a wiring substrate 160 through conductive connectors 170, in accordance with some embodiments. The wiring substrate 160 includes wiring layers (not shown), conductive vias (not shown), a dielectric layer (not shown), and bonding pads (not shown), in accordance with some embodiments. The wiring layers and the conductive vias are formed in the dielectric layer, in accordance with some embodiments.

The bonding pads are over the dielectric layer, in accordance with some embodiments. The conductive vias are electrically connected between different wiring layers and between the wiring layers and the bonding pads, in accordance with some embodiments.

The dielectric layer is made of an insulating material such as a polymer material (e.g., polybenzoxazole, polyimide, or a photosensitive material), nitride (e.g., silicon nitride), oxide (e.g., silicon oxide), silicon oxynitride, or the like, in accordance with some embodiments.

The dielectric layer is formed using deposition processes (e.g. chemical vapor deposition processes or physical vapor deposition processes), photolithography processes, and etching processes, in accordance with some embodiments.

The wiring layers are made of a conductive material, such as metal (e.g. copper, aluminum, or tungsten) or alloys thereof, in accordance with some embodiments. The conductive vias are made of a conductive material, such as metal (e.g. copper, aluminum, or tungsten) or alloys thereof, in accordance with some embodiments. The conductive pads are made of a conductive material, such as metal (e.g. copper, aluminum, or tungsten) or alloys thereof, in accordance with some embodiments.

In some embodiments, the conductive pads, the wiring layers, and the conductive vias are made of the same material. In some other embodiments, the conductive pads, the wiring layers, and the conductive vias are made of different materials.

The conductive connectors 170 are bonded to the conductive pads of the wiring substrate 160, in accordance with some embodiments. The conductive connectors 170 are used to electrically connected between the co-packaged optical device 130 and the wiring substrate 160, in accordance with some embodiments.

The conductive connectors 170 are made of a conductive material such as copper (Cu), aluminum (Al), tungsten (W), cobalt (Co), nickel (Ni), or tin (Sn), in accordance with some embodiments. The conductive connectors 170 are formed using a plating process such as an electroplating process, in accordance with some embodiments.

As shown in FIGS. 1A and 1F, an underfill layer 180 is formed between the co-packaged optical device 130 and the wiring substrate 160, in accordance with some embodiments. The underfill layer 180 surrounds the conductive connectors 170, in accordance with some embodiments. The underfill layer 180 is made of a polymer material, in accordance with some embodiments.

The fiber array unit structure 110, the optical fibers 120, the co-packaged optical device 130, the fiber shield structure 140, the adhesive layer 150, the wiring substrate 160, the conductive connectors 170, and the underfill layer 180 together form an optical device structure 101, in accordance with some embodiments.

As shown in FIG. 1A, a housing 192 and a fan system 194 are provided, in accordance with some embodiments. The fan system 194 is mounted to the housing 192, in accordance with some embodiments. As shown in FIG. 1A, the optical device structure 101 is disposed into a chamber 192*a* of the housing 192, in accordance with some embodiments.

The fan system 194 is used to provide air flows A into the chamber 192*a* of the housing 192 for cooling the optical device structure 101, in accordance with some embodiments. The fan system 194 is also referred to as an air-cooling system, in accordance with some embodiments. The fiber shield structure 140 and the optical fibers 120 penetrate through the housing 192, in accordance with some embodiments.

In this step, the optical device structure 101, the housing 192, and the fan system 194 together form a server S1, in accordance with some embodiments. In the server S1, the fan system 194 provides the air flows A passing by the optical device structure 101 for cooling the optical device structure 101, in accordance with some embodiments.

The fiber shield structure 140 prevents the optical fibers 120 from being affected by the air flows A, in accordance with some embodiments. Therefore, the lifetime, the stability, and the efficiency of the optical device structure 101 are improved, in accordance with some embodiments.

As shown in FIG. 1C, the fiber shield structure 140 is wider than the fiber array unit structure 110, in accordance with some embodiments. That is, the width W140 of the fiber shield structure 140 is greater than the width W110 of the fiber array unit structure 110, in accordance with some embodiments. The width W140 ranges from about 0.1 mm to about 20 mm, in accordance with some embodiments.

Figure 1G:
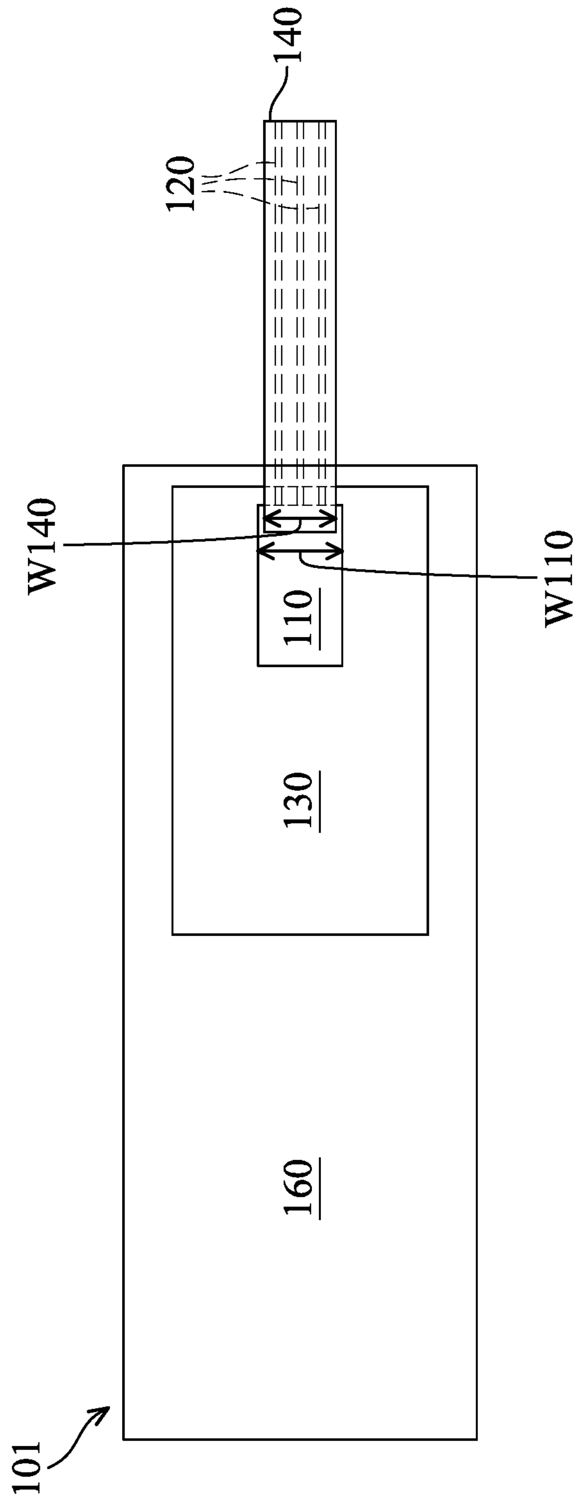
FIG. 1G is a top view of the optical device structure of FIG. 1A, in accordance with some other embodiments.

In some other embodiments, as shown in FIG. 1G, the fiber shield structure 140 is narrower than the fiber array unit structure 110, in accordance with some embodiments. That is, the width W140 of the fiber shield structure 140 is less than the width W110 of the fiber array unit structure 110, in accordance with some embodiments.

Figure 2A:
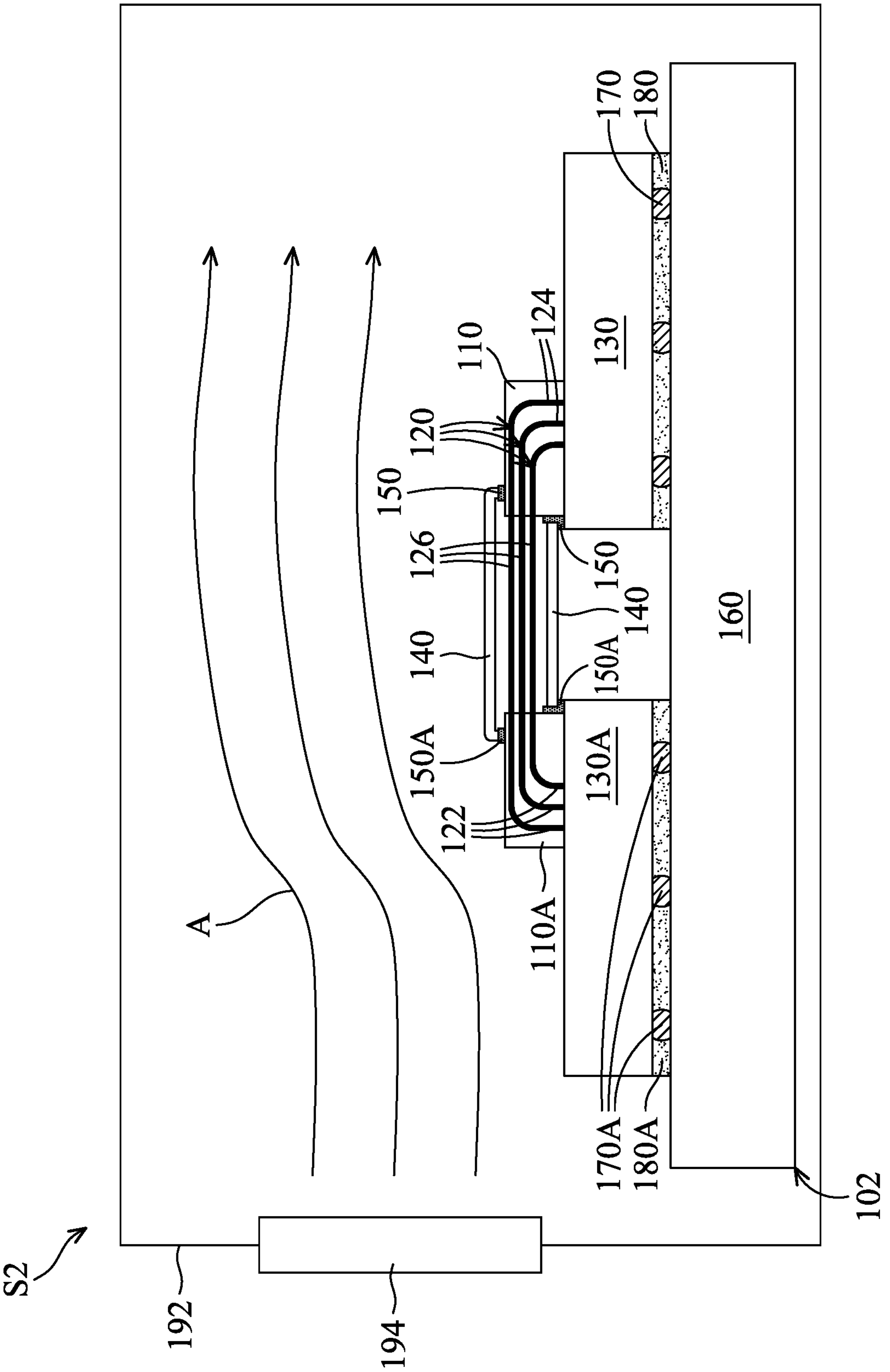
FIG. 2A is a cross-sectional view of a server, in accordance with some embodiments.

FIG. 2A is a cross-sectional view of a server S2, in accordance with some embodiments. As shown in FIG. 2A, the server S2 is similar to the server S1 of FIG. 1A, except that the optical device structure 102 of the server S2 further has a fiber array unit structure 110A, a co-packaged optical device 130A, an adhesive layer 150A, conductive connectors 170A, and an underfill layer 180A, in accordance with some embodiments.

Each optical fiber 120 has opposite end portions 122 and 124 and a main portion 126 between the end portions 122 and 124, in accordance with some embodiments. The end portions 122 of the optical fibers 120 are in the fiber array unit structure 110A, in accordance with some embodiments.

The end portions 124 of the optical fibers 120 are in the fiber array unit structure 110, in accordance with some embodiments. The fiber shield structure 140 covers the main portions 126 of the optical fibers 120, in accordance with some embodiments.

The end portions 122 and the fiber array unit structure 110A are bonded to the co-packaged optical device 130A, in accordance with some embodiments. The end portions 124 and the fiber array unit structure 110 are bonded to the co-packaged optical device 130, in accordance with some embodiments.

The fiber shield structure 140 is further bonded to the fiber array unit structure 110A and the co-packaged optical device 130A through the adhesive layer 150A, in accordance with some embodiments. The co-packaged optical device 130A is bonded to the wiring substrate 160 through conductive connectors 170A, in accordance with some embodiments.

The underfill layer 180A is formed between the co-packaged optical device 130A and the wiring substrate 160, in accordance with some embodiments. The underfill layer 180A surrounds the conductive connectors 170A, in accordance with some embodiments.

The materials of the fiber array unit structure 110A, the co-packaged optical device 130A, the adhesive layer 150A, the conductive connectors 170A, and the underfill layer 180A are the same as or similar to that of the fiber array unit structure 110, the co-packaged optical device 130, the adhesive layer 150, the conductive connectors 170, and the underfill layer 180, respectively, in accordance with some embodiments.

Figure 2B:
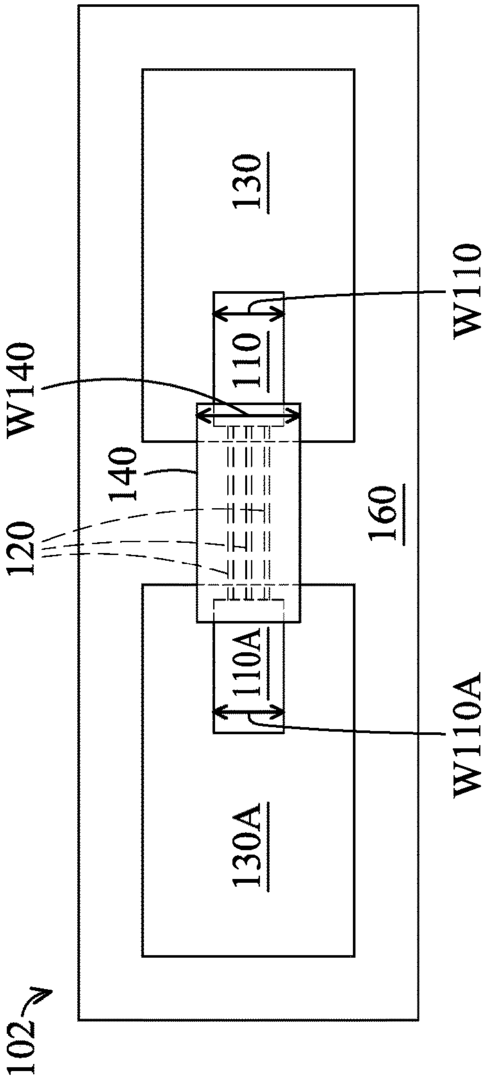
FIG. 2B is a top view of the optical device structure of FIG. 2A, in accordance with some embodiments.

FIG. 2B is a top view of the optical device structure of FIG. 2A, in accordance with some embodiments. As shown in FIG. 2B, the fiber shield structure 140 is wider than the fiber array unit structure 110 or 110A, in accordance with some embodiments. That is, the width W140 of the fiber shield structure 140 is greater than the width W110 of the fiber array unit structure 110 or the width W110A of the fiber array unit structure 110A, in accordance with some embodiments.

Figure 2C:
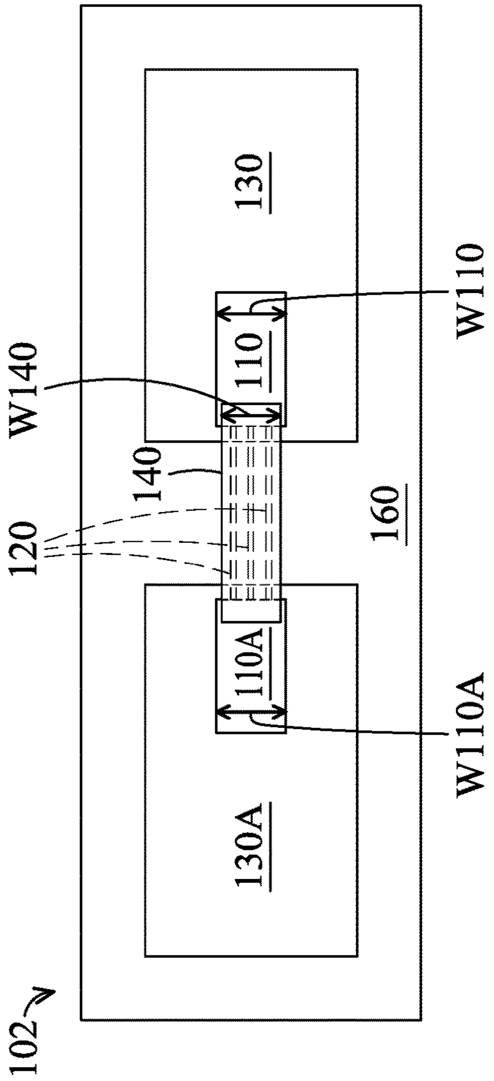
FIG. 2C is a top view of the optical device structure of FIG. 2A, in accordance with some other embodiments.

FIG. 2C is a top view of the optical device structure of FIG. 2A, in accordance with some other embodiments. As shown in FIG. 2C, the fiber shield structure 140 is narrower than the fiber array unit structure 110 or 110A, in accordance with some embodiments. That is, the width W140 of the fiber shield structure 140 is less than the width W110 of the fiber array unit structure 110 or the width W110A of the fiber array unit structure 110A, in accordance with some embodiments.

Figure 3:
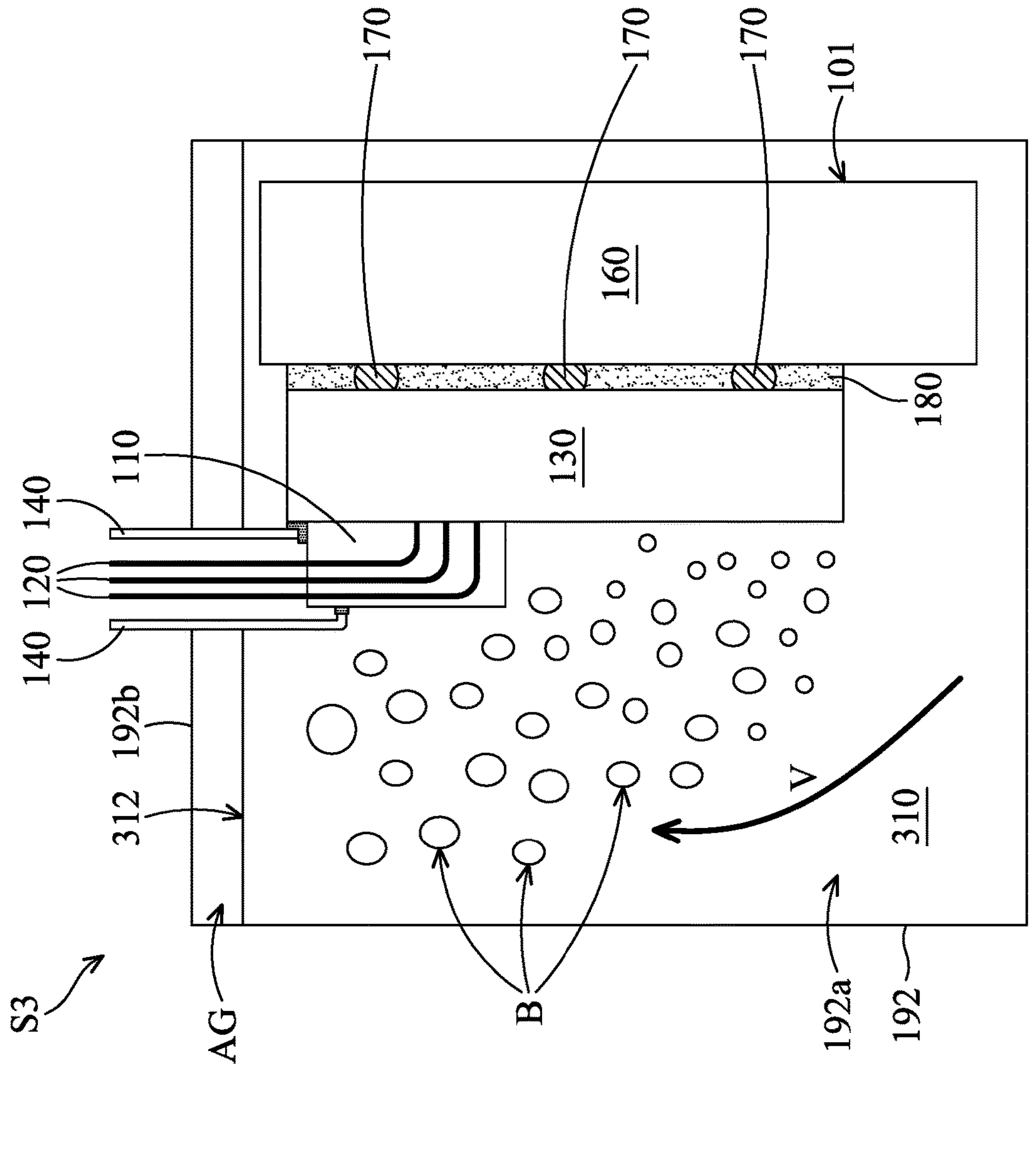
FIG. 3 is a cross-sectional view of a server, in accordance with some embodiments.

FIG. 3 is a cross-sectional view of a server S3, in accordance with some embodiments. As shown in FIG. 3, the server S3 is similar to the server S1 of FIG. 1A, except that the server S3 does not have the fan system 194 and further has a working fluid 310, in accordance with some embodiments. The working fluid 310 is also referred to as a cooling fluid, in accordance with some embodiments.

The optical device structure 101 is vertically immersed in the working fluid 310, in accordance with some embodiments. The working fluid 310 is made of a fluorinated solution, silicon oil, or the like, in accordance with some embodiments. The liquid surface 312 is spaced apart from the top portion 192*b* of the housing 192 by an air gap AG, in accordance with some embodiments.

In the server S3, there are bubbles B in the working fluid 310, in accordance with some embodiments. The bubbles B float upwards in a direction V, in accordance with some embodiments. The bubbles B pass by the optical device structure 101, in accordance with some embodiments.

The fiber shield structure 140 prevents the optical fibers 120 from being affected by the bubbles B, in accordance with some embodiments. Therefore, the lifetime, the stability, and the efficiency of the optical device structure 101 are improved, in accordance with some embodiments.

Figure 4:
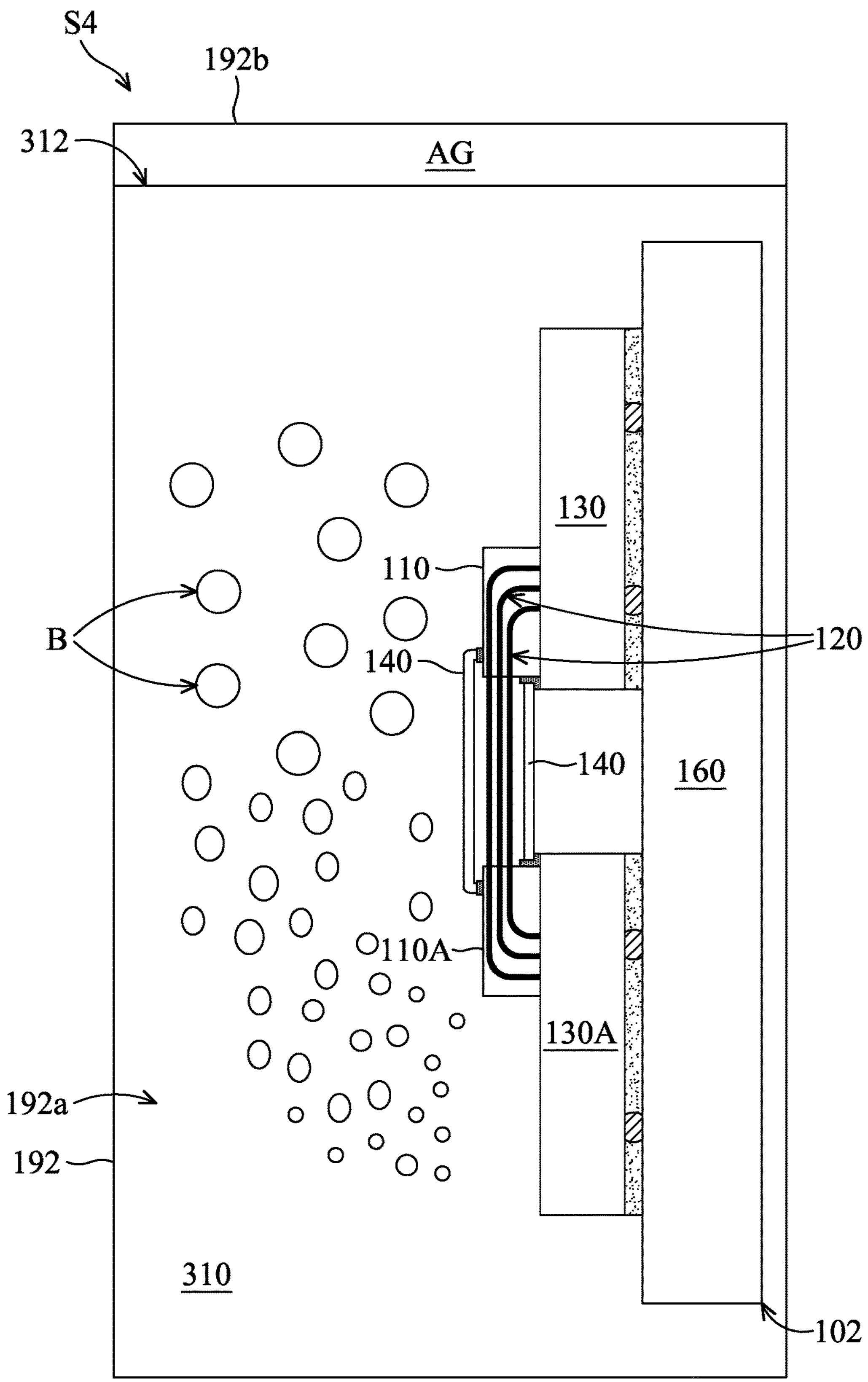
FIG. 4 is a cross-sectional view of a server, in accordance with some embodiments.

FIG. 4 is a cross-sectional view of a server S4, in accordance with some embodiments. As shown in FIG. 4, the server S4 is similar to the server S2 of FIG. 2A, except that the server S4 does not have the fan system 194 and further has a working fluid 310, in accordance with some embodiments.

The optical device structure 102 is vertically immersed in the working fluid 310, in accordance with some embodiments. The working fluid 310 is made of a fluorinated solution, silicon oil, or the like, in accordance with some embodiments. The liquid surface 312 is spaced apart from the top portion 192*b* of the housing 192 by an air gap AG, in accordance with some embodiments.

Figure 5A:
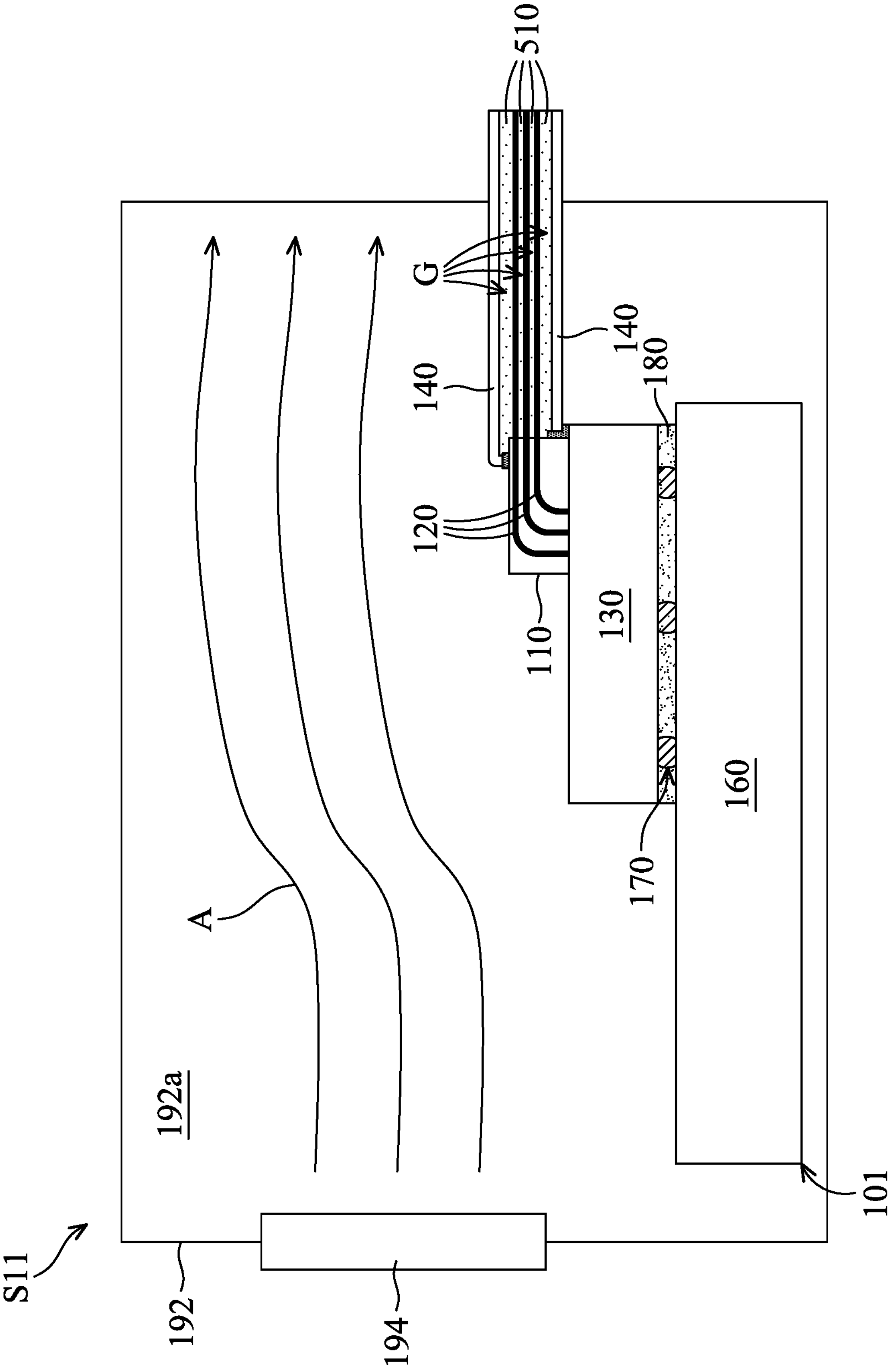
FIG. 5A is a cross-sectional view of a server, in accordance with some embodiments.

FIG. 5A is a cross-sectional view of a server S11, in accordance with some embodiments. As shown in FIG. 5A, the server S11 is similar to the server S1 of FIG. 1A, except that the optical device structure 101 of the server S11 further has a thermal interface layer 510, in accordance with some embodiments.

There is a gap G between the fiber shield structure 140 and the optical fibers 120, in accordance with some embodiments. The thermal interface layer 510 is formed in the gap G, in accordance with some embodiments. The thermal interface layer 510 surrounds the optical fibers 120, in accordance with some embodiments. The thermal interface layer 510 is in direct contact with the optical fibers 120 and the fiber shield structure 140, in accordance with some embodiments.

The thermal conductivity of the thermal interface layer 510 is greater than that of air, in accordance with some embodiments. The thermal conductivity of the thermal interface layer 510 is greater than a thermal conductivity of the optical fibers 120, in accordance with some embodiments.

The thermal conductivity of the fiber shield structure 140 is greater than the thermal conductivity of the thermal interface layer 510, in accordance with some embodiments. The thermal interface layer 510 is made of a polymer material, tin (Sn), silver (Ag), graphite, and/or the like, in accordance with some embodiments.

Since the thermal conductivity of the thermal interface layer 510 is greater than that of air, the thermal interface layer 510 can improve the heat dissipation of the optical fibers 120, in accordance with some embodiments.

Figure 5B:
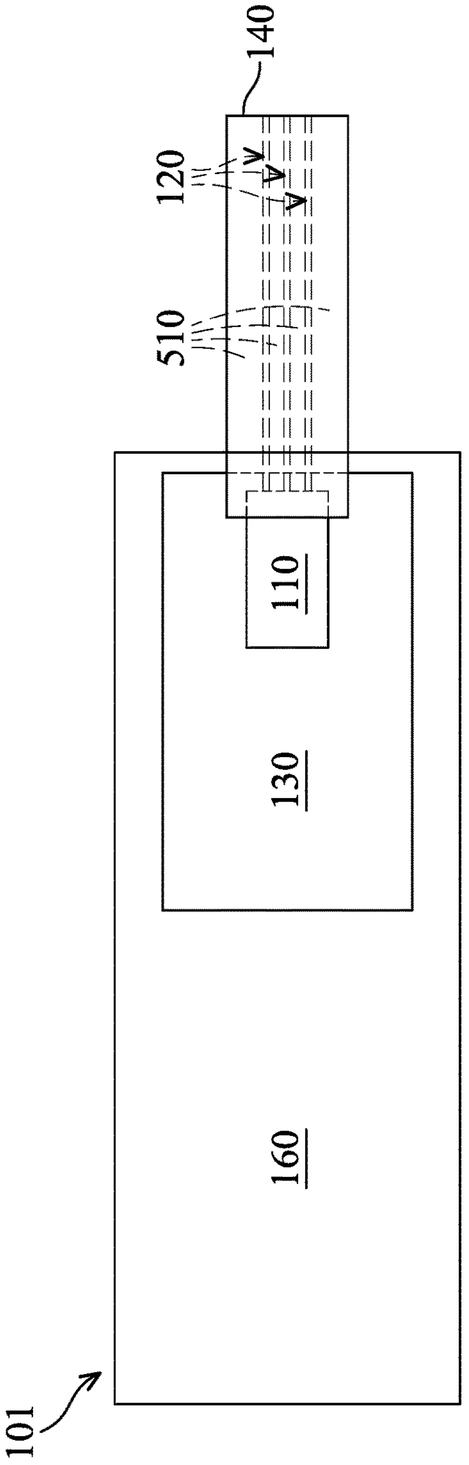
FIG. 5B is a top view of the optical device structure of FIG. 5A, in accordance with some embodiments.

FIG. 5B is a top view of the optical device structure 101 of FIG. 5A, in accordance with some embodiments. As shown in FIG. 5B, the fiber shield structure 140 is wider than the fiber array unit structure 110, in accordance with some embodiments. In some other embodiments, as shown in FIG. 5C, the fiber shield structure 140 is narrower than the fiber array unit structure 110, in accordance with some embodiments.

Figure 5C:
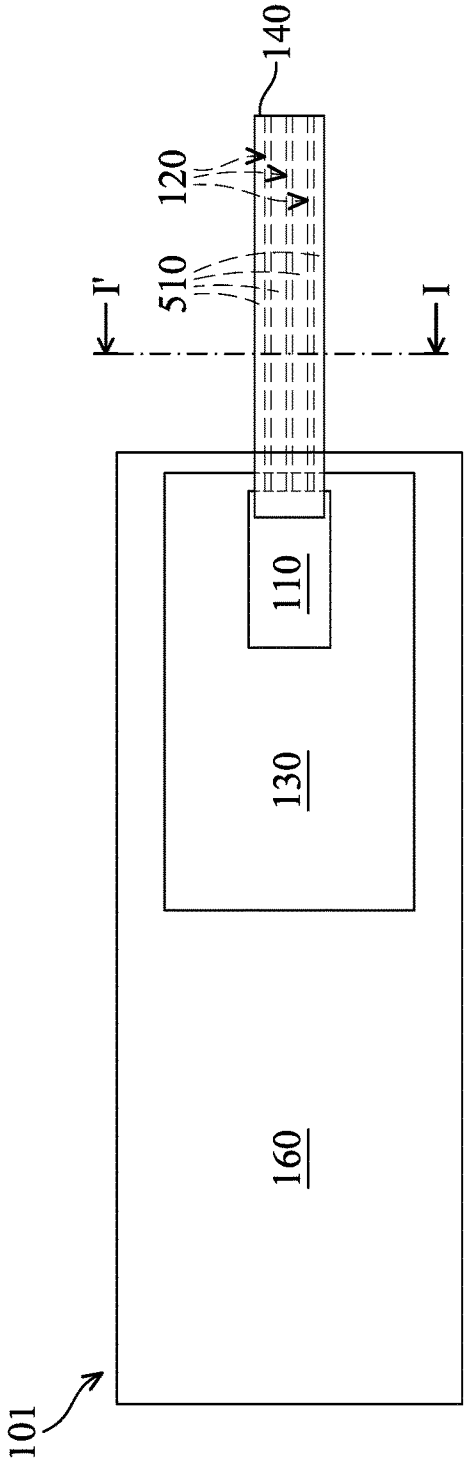
FIG. 5C is a top view of the optical device structure of FIG. 5A, in accordance with some other embodiments.
Figure 5D:
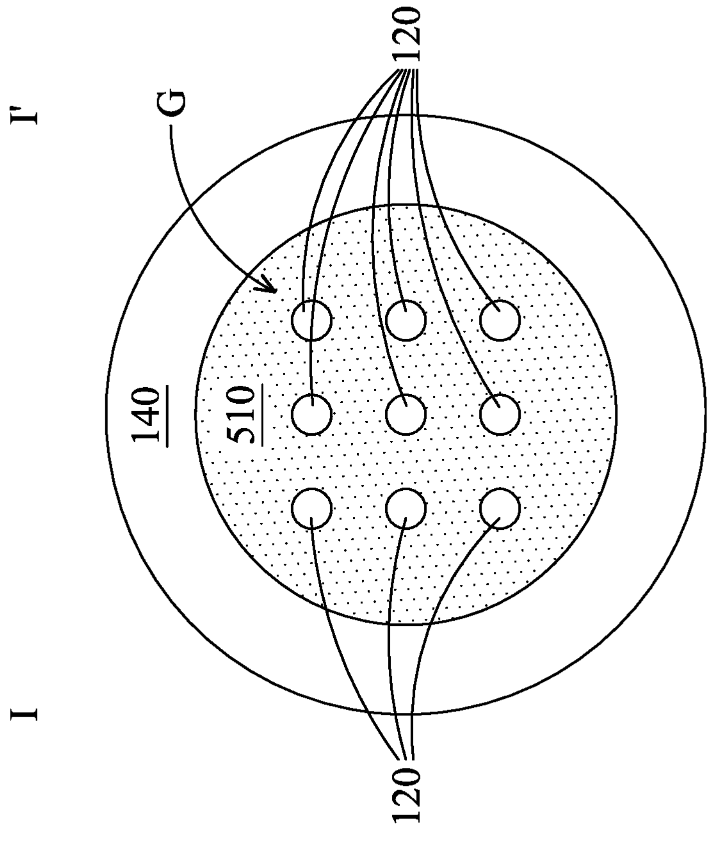
FIG. 5D is a cross-sectional view illustrating the optical fibers and the fiber shield structure along a sectional line I-I' in FIG. 5C, in accordance with some embodiments.

FIG. 5D is a cross-sectional view illustrating the optical fibers and the fiber shield structure along a sectional line I-I' in FIG. 5C, in accordance with some embodiments. As shown in FIG. 5D, the fiber shield structure 140 surrounds the optical fibers 120 and the thermal interface layer 510, in accordance with some embodiments.

The fiber shield structure 140 is separated from the optical fibers 120 by the thermal interface layer 510, in accordance with some embodiments. The fiber shield structure 140 has a round-like shape, in accordance with some embodiments.

Figure 5E:
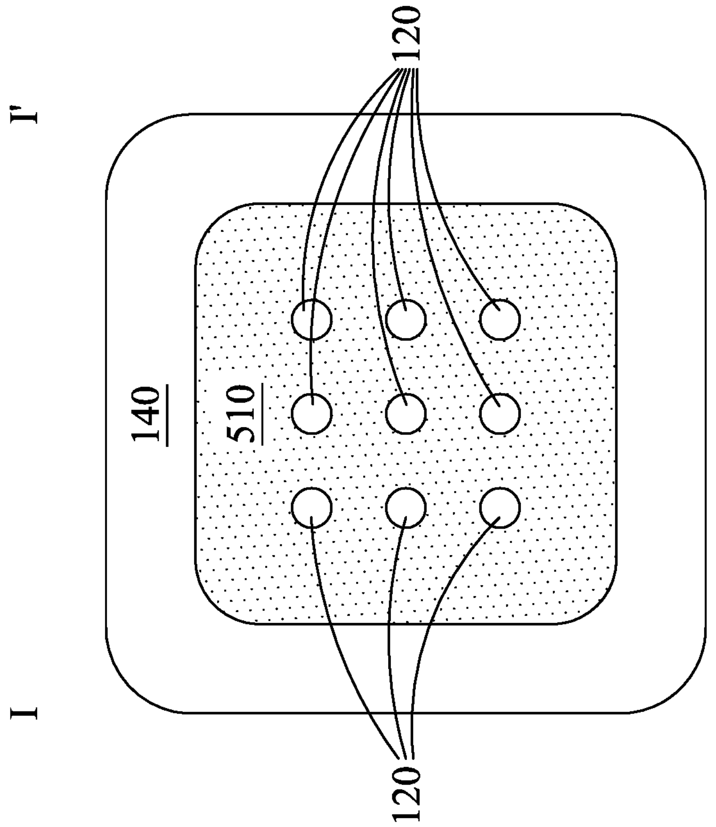
FIG. 5E is a cross-sectional view illustrating the optical fibers and the fiber shield structure along a sectional line I-I' in FIG. 5C, in accordance with some other embodiments.

FIG. 5E is a cross-sectional view illustrating the optical fibers and the fiber shield structure along a sectional line I-I' in FIG. 5C, in accordance with some other embodiments. As shown in FIG. 5E, the fiber shield structure 140 has a square-like shape, in accordance with some embodiments.

Figure 6:
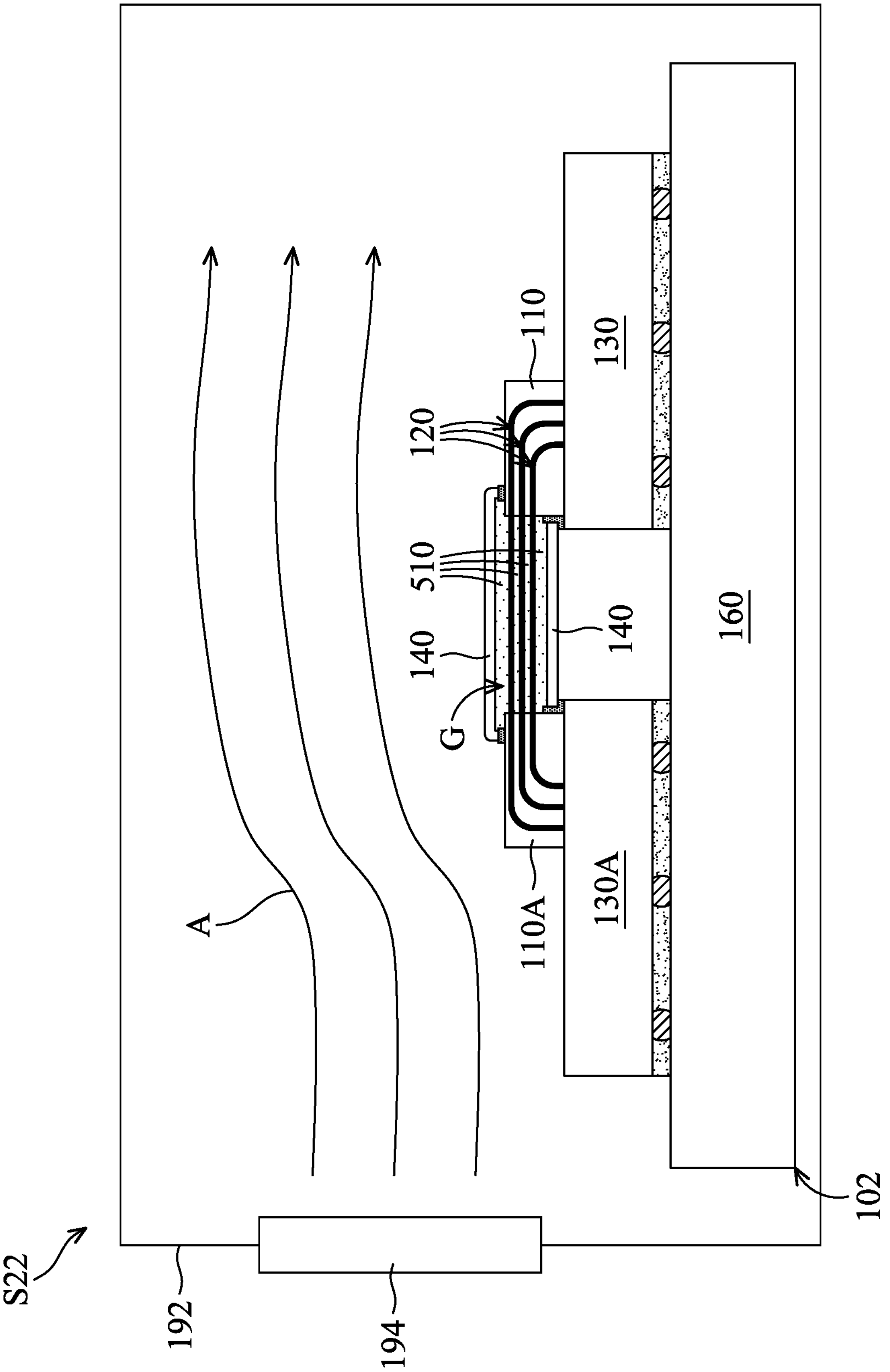
FIG. 6 is a cross-sectional view of a server, in accordance with some embodiments.

FIG. 6 is a cross-sectional view of a server S22, in accordance with some embodiments. As shown in FIG. 6, the server S22 is similar to the server S2 of FIG. 2A, except that the optical device structure 102 of the server S22 further has a thermal interface layer 510, in accordance with some embodiments.

There is a gap G between the fiber shield structure 140 and the optical fibers 120, in accordance with some embodiments. The thermal interface layer 510 is formed in the gap G, in accordance with some embodiments. The thermal interface layer 510 surrounds the optical fibers 120, in accordance with some embodiments. The thermal interface layer 510 is in direct contact with the optical fibers 120 and the fiber shield structure 140, in accordance with some embodiments.

Figure 7:
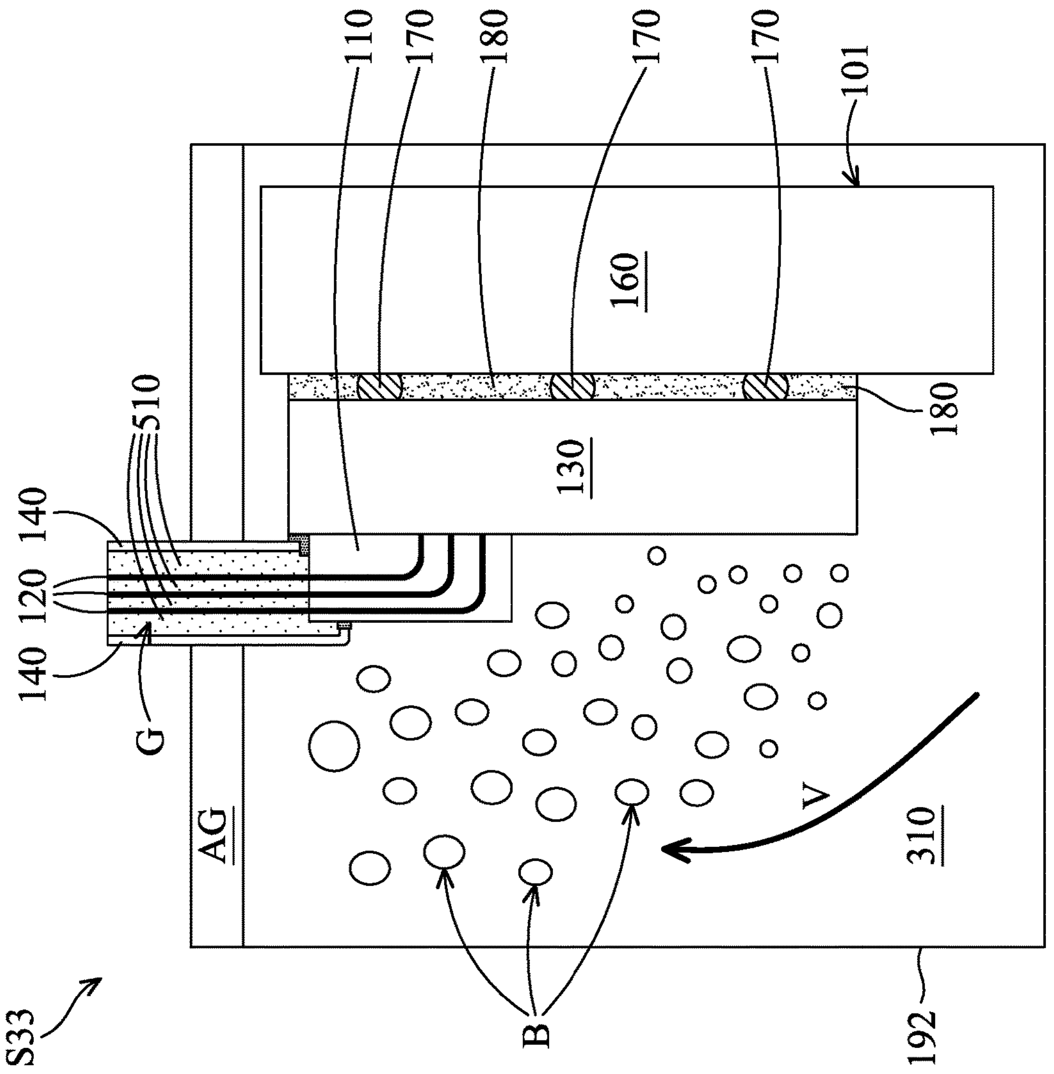
FIG. 7 is a cross-sectional view of a server, in accordance with some embodiments.

FIG. 7 is a cross-sectional view of a server S33, in accordance with some embodiments. As shown in FIG. 7, the server S33 is similar to the server S3 of FIG. 3, except that the optical device structure 101 of the server S33 further has a thermal interface layer 510, in accordance with some embodiments.

There is a gap G between the fiber shield structure 140 and the optical fibers 120, in accordance with some embodiments. The thermal interface layer 510 is formed in the gap G, in accordance with some embodiments. The thermal interface layer 510 surrounds the optical fibers 120, in accordance with some embodiments. The thermal interface layer 510 is in direct contact with the optical fibers 120 and the fiber shield structure 140, in accordance with some embodiments.

Figure 8:
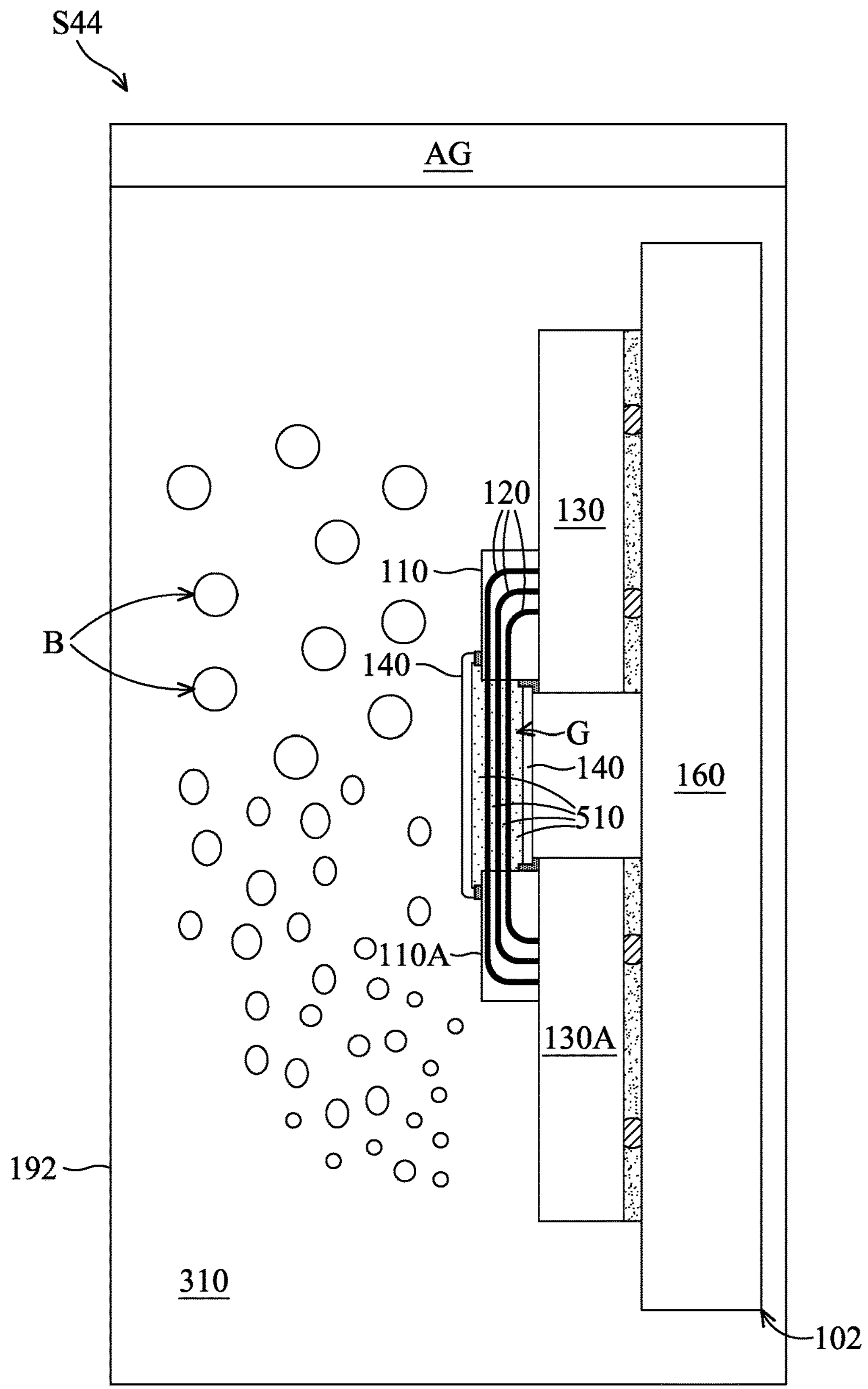
FIG. 8 is a cross-sectional view of a server, in accordance with some embodiments.

FIG. 8 is a cross-sectional view of a server, in accordance with some embodiments. As shown in FIG. 8, the server S44 is similar to the server S4 of FIG. 4, except that the optical device structure 102 of the server S44 further has a thermal interface layer 510, in accordance with some embodiments.

There is a gap G between the fiber shield structure 140 and the optical fibers 120, in accordance with some embodiments. The thermal interface layer 510 is formed in the gap G, in accordance with some embodiments. The thermal interface layer 510 surrounds the optical fibers 120, in accordance with some embodiments. The thermal interface layer 510 is in direct contact with the optical fibers 120 and the fiber shield structure 140, in accordance with some embodiments.

Figure 9A:
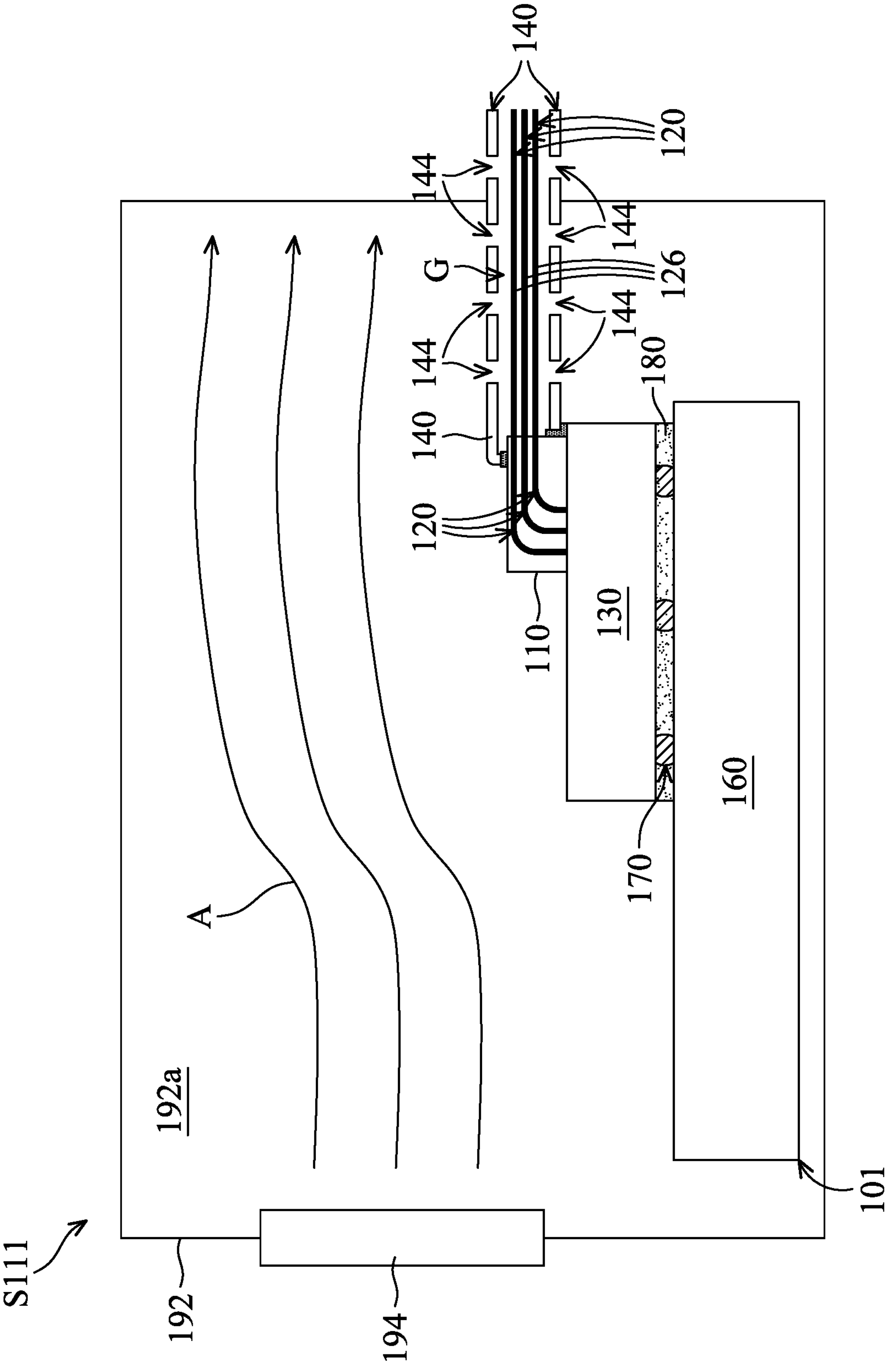
FIG. 9A is a cross-sectional view of a server, in accordance with some embodiments.

FIG. 9A is a cross-sectional view of a server S111, in accordance with some embodiments. As shown in FIG. 9A, the server S111 is similar to the server S1 of FIG. 1A, except that the fiber shield structure 140 of the optical device structure 101 of the server S111 has through holes 144, in accordance with some embodiments. The through holes 144 expose parts of the main portion 126 of the optical fibers 120, in accordance with some embodiments.

The through holes 144 communicate with the gap G between the optical fibers 120 and the fiber shield structure 140, in accordance with some embodiments. Therefore, the air in the chamber 192*a* of the housing 192 can flow into the gap G through the through holes 144 to take the heat generated by the optical fibers 120 away, thereby improving the heat dissipation of the optical fibers 120, in accordance with some embodiments. The fiber shield structure 140 prevents the optical fibers 120 from being affected by the air flow A, in accordance with some embodiments.

Figure 9B:
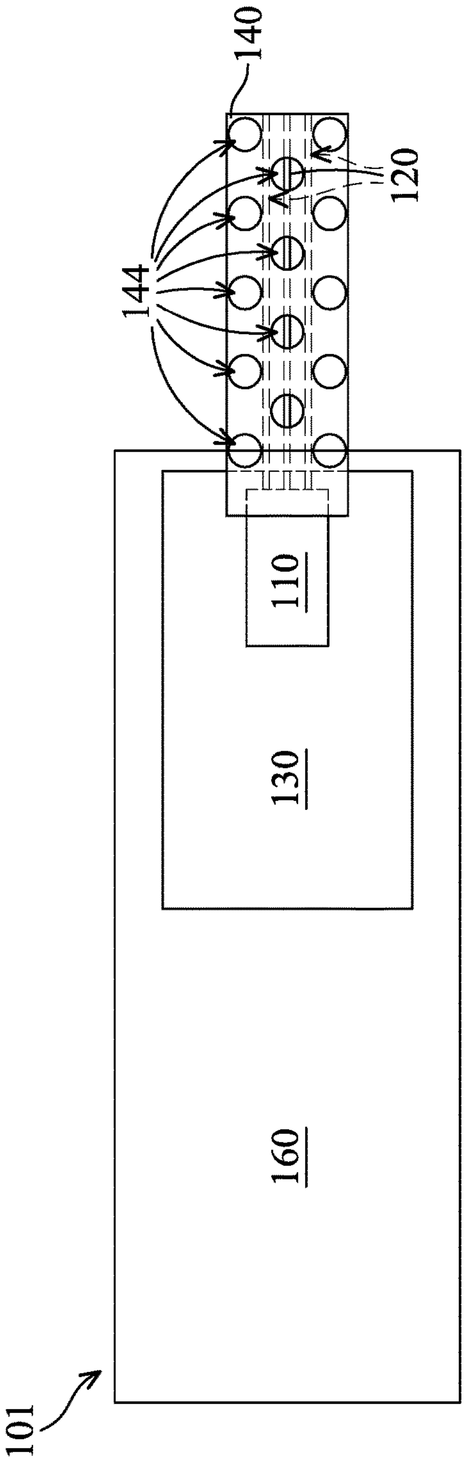
FIG. 9B is a top view of the optical device structure of FIG. 9A, in accordance with some embodiments.

FIG. 9B is a top view of the optical device structure of FIG. 9A, in accordance with some embodiments. As shown in FIG. 9B, the fiber shield structure 140 is wider than the fiber array unit structure 110, in accordance with some embodiments. In some other embodiments, as shown in FIG. 9C, the fiber shield structure 140 is narrower than the fiber array unit structure 110, in accordance with some embodiments.

Figure 9C:
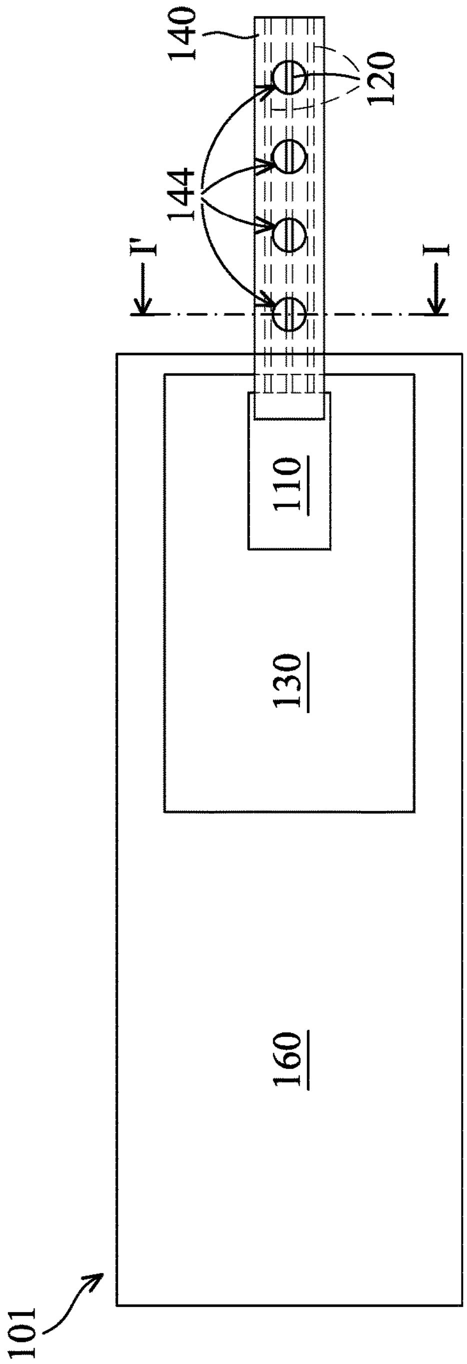
FIG. 9C is a top view of the optical device structure of FIG. 9A, in accordance with some other embodiments.
Figure 9E:
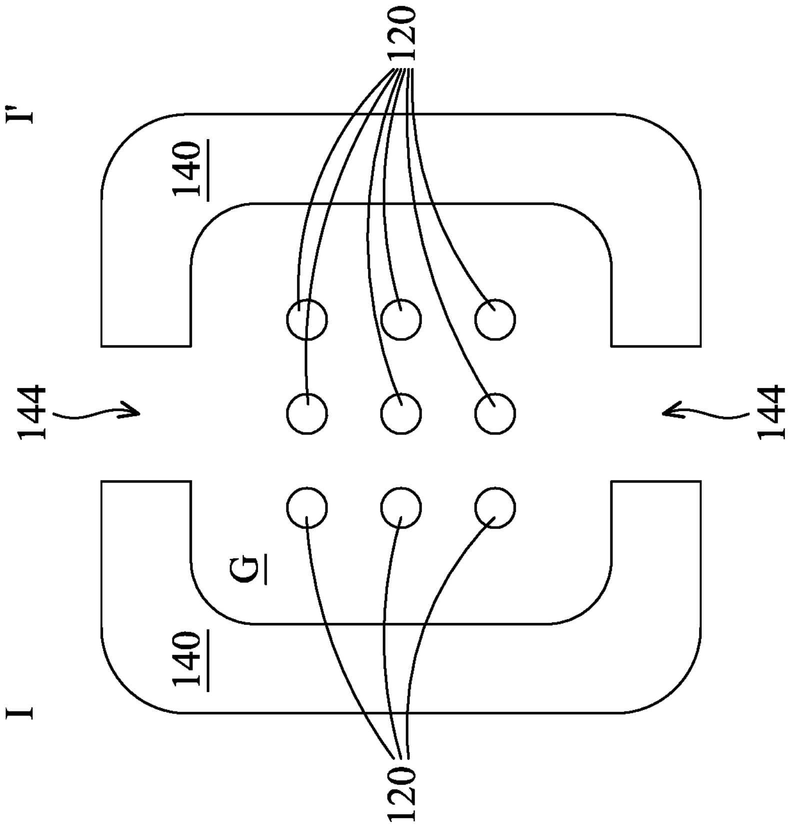
FIG. 9E is a cross-sectional view illustrating the optical fibers and the fiber shield structure along a sectional line I-I' in FIG. 9C, in accordance with some other embodiments.
Figure 9D:
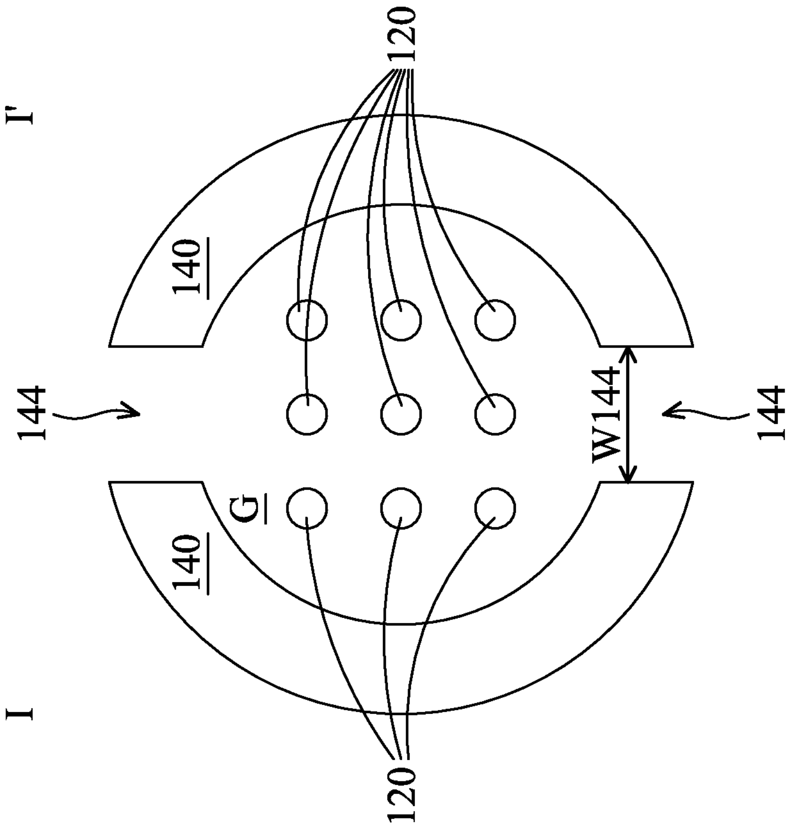
FIG. 9D is a cross-sectional view illustrating the optical fibers and the fiber shield structure along a sectional line I-I' in FIG. 9C, in accordance with some embodiments.

FIG. 9D is a cross-sectional view illustrating the optical fibers and the fiber shield structure along a sectional line I-I' in FIG. 9C, in accordance with some embodiments. As shown in FIG. 9D, the fiber shield structure 140 has a round-like shape, in accordance with some embodiments. The width W144 of the through hole 144 of the fiber shield structure 140 ranges from about 0.1 mm to about 5 mm, in accordance with some embodiments.

FIG. 9E is a cross-sectional view illustrating the optical fibers and the fiber shield structure along a sectional line I-I' in FIG. 9C, in accordance with some other embodiments. As shown in FIG. 9E, the fiber shield structure 140 has a square-like shape, in accordance with some embodiments.

Figure 10A:
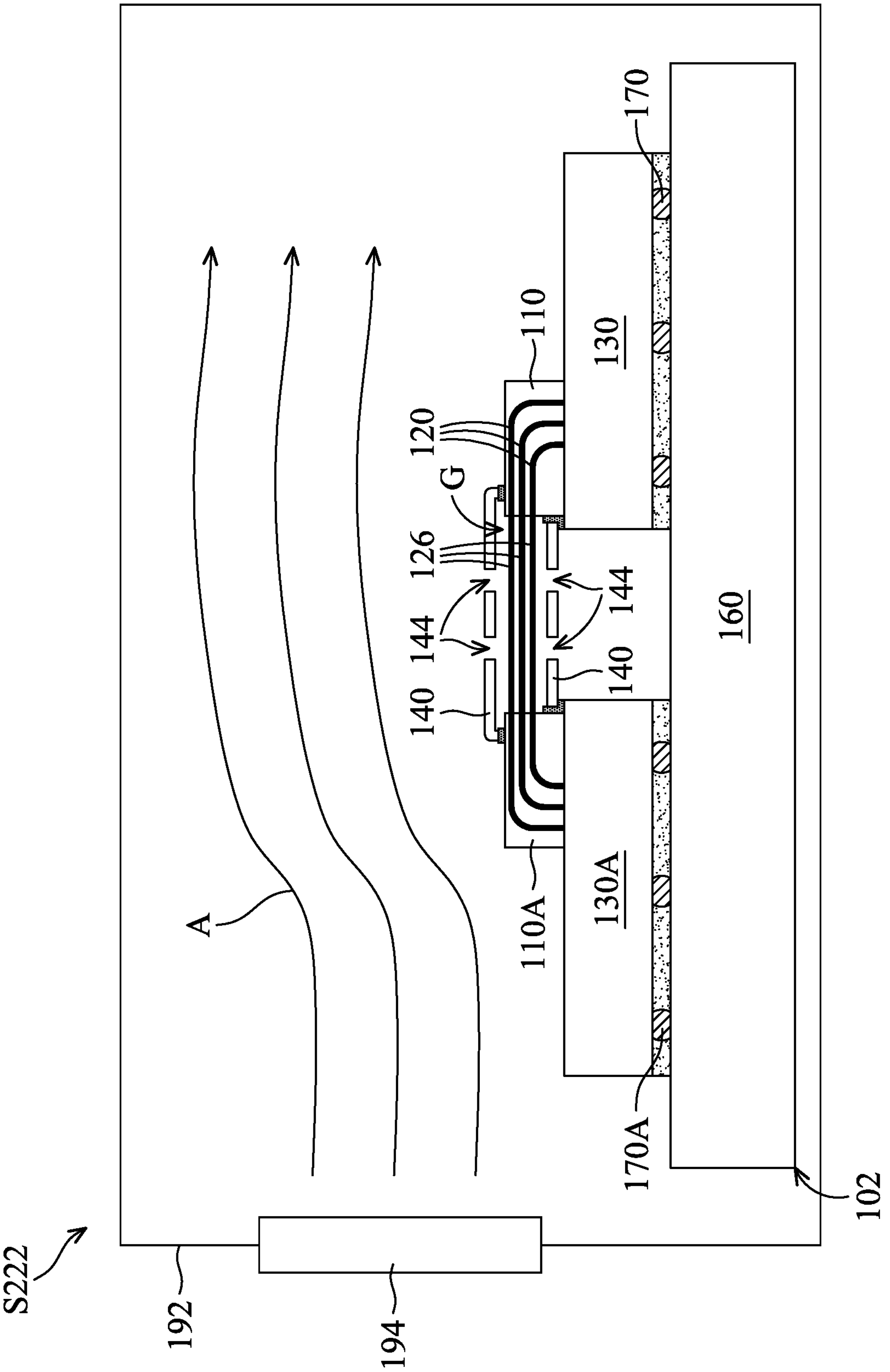
FIG. 10A is a cross-sectional view of a server, in accordance with some embodiments.

FIG. 10A is a cross-sectional view of a server S222, in accordance with some embodiments. As shown in FIG. 10A, the server S222 is similar to the server S2 of FIG. 2A, except that the fiber shield structure 140 of the optical device structure 102 of the server S222 has through holes 144, in accordance with some embodiments.

The through holes 144 expose parts of the main portion 126 of the optical fibers 120, in accordance with some embodiments. The through holes 144 communicate with the gap G between the optical fibers 120 and the fiber shield structure 140, in accordance with some embodiments.

Figure 10B:
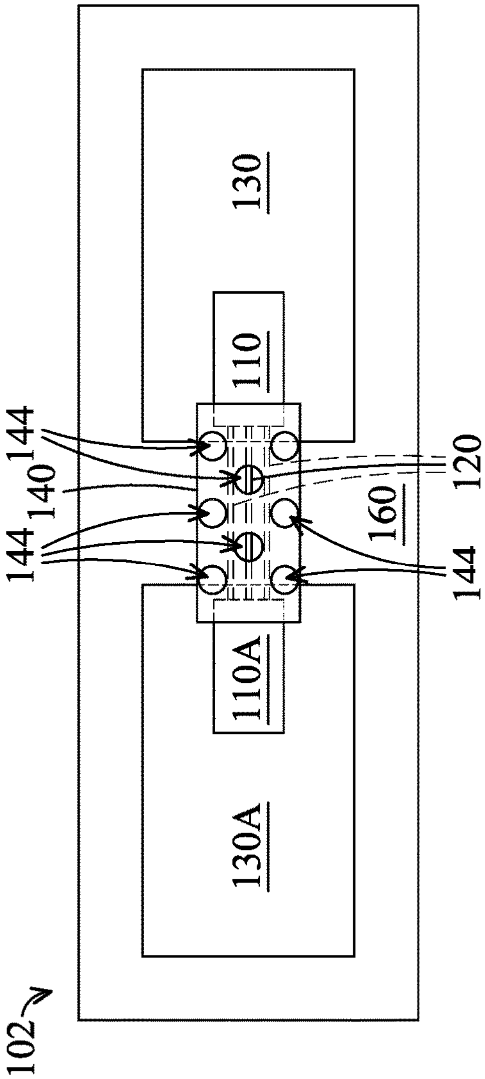
FIG. 10B is a top view of the optical device structure of FIG. 10A, in accordance with some embodiments.
Figure 10C:
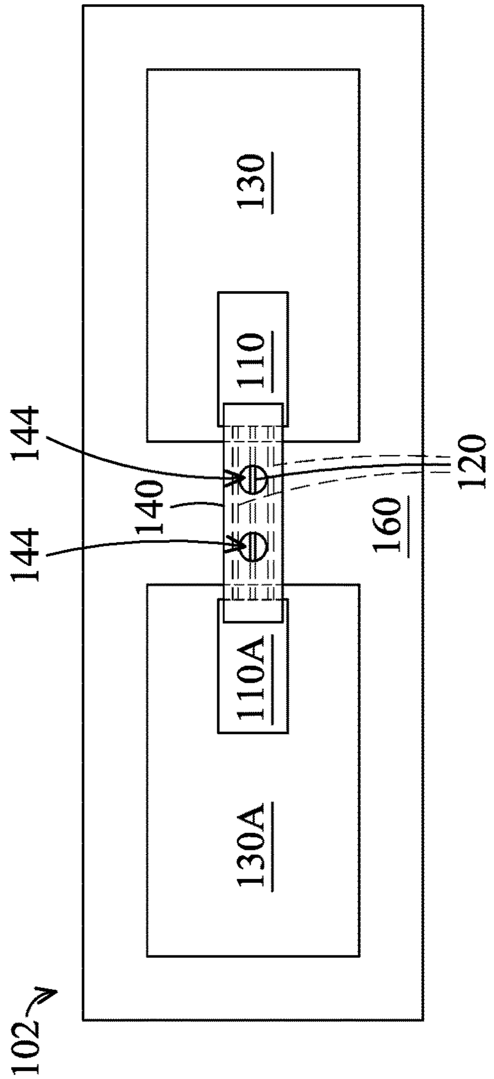
FIG. 10C is a top view of the optical device structure of FIG. 10A, in accordance with some other embodiments.

FIG. 10B is a top view of the optical device structure of FIG. 10A, in accordance with some embodiments. As shown in FIG. 10B, the fiber shield structure 140 is wider than the fiber array unit structure 110 or 110A, in accordance with some embodiments. In some other embodiments, as shown in FIG. 10C, the fiber shield structure 140 is narrower than the fiber array unit structure 110 or 110A, in accordance with some embodiments.

Figure 11:
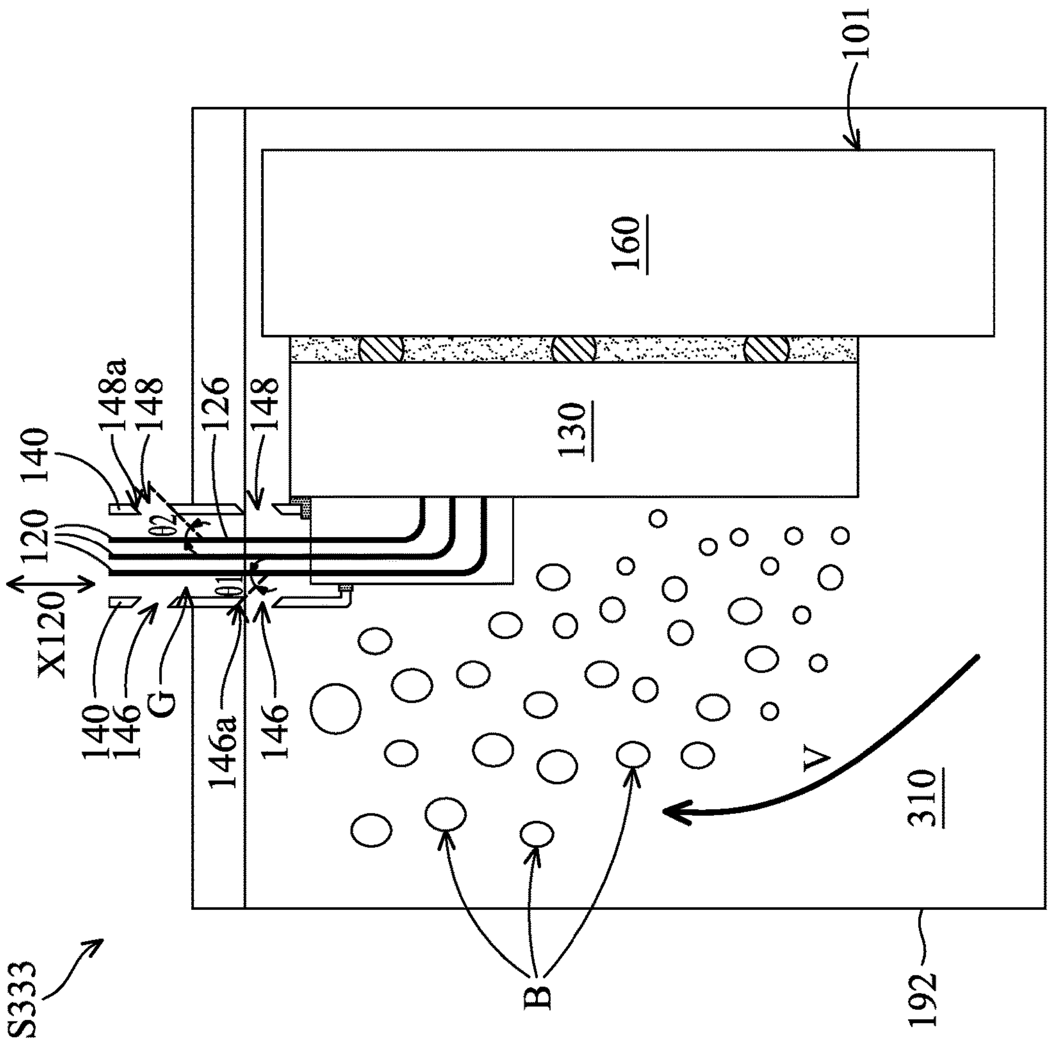
FIG. 11 is a cross-sectional view of a server, in accordance with some embodiments.

FIG. 11 is a cross-sectional view of a server S333, in accordance with some embodiments. As shown in FIG. 11, the server S333 is similar to the server S3 of FIG. 3, except that the fiber shield structure 140 of the optical device structure 101 of the server S333 has through holes 146 and 148, in accordance with some embodiments.

The through holes 146 and 148 expose parts of the main portions 126 of the optical fibers 120, in accordance with some embodiments. The through holes 146 and 148 communicate with the gap G between the optical fibers 120 and the fiber shield structure 140, in accordance with some embodiments.

The working fluid 310 flows into the gap G through the through holes 146 and 148 to take the heat generated by the optical fibers 120 away, thereby improving the heat dissipation of the optical fibers 120, in accordance with some embodiments.

In some embodiments, an angle θ1 between an inner wall 146*a* of the through hole 146 and a longitudinal axis X120 of the optical fiber 120 is greater than about 0° and less than about 90°. In some embodiments, an angle θ2 between an inner wall 148*a* of the through hole 148 and the longitudinal axis X120 of the optical fiber 120 is greater than about 0° and less than about 90°. The inner wall 146*a* of the through hole 146 is not parallel to the inner wall 148*a* of the through hole 148, in accordance with some embodiments.

Since the angle θ1 or θ2 is less than about 90°, the design of the through holes 146 and 148 can prevent the bubbles B from floating into the gap G through the through holes 146 and 148, in accordance with some embodiments. Therefore, the fiber shield structure 140 can prevent the optical fibers 120 from being affected by the bubbles B, in accordance with some embodiments.

Figure 12:
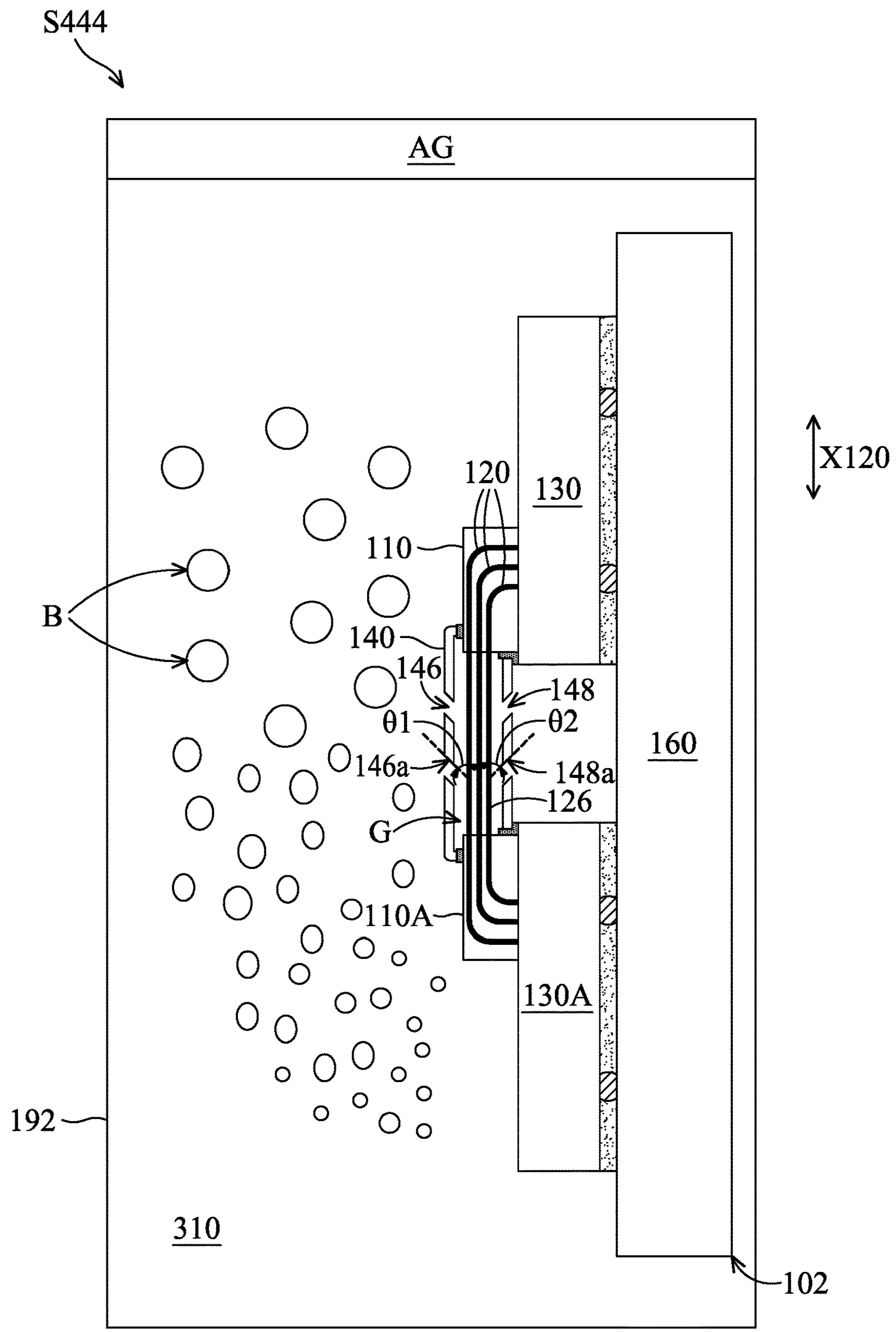
FIG. 12 is a cross-sectional view of a server, in accordance with some embodiments.

FIG. 12 is a cross-sectional view of a server S444, in accordance with some embodiments. As shown in FIG. 12, the server S444 is similar to the server S4 of FIG. 4, except that the fiber shield structure 140 of the optical device structure 102 of the server S444 has through holes 146 and 148, in accordance with some embodiments.

The through holes 146 and 148 expose parts of the main portions 126 of the optical fibers 120, in accordance with some embodiments. The through holes 146 and 148 communicate with the gap G between the optical fibers 120 and the fiber shield structure 140, in accordance with some embodiments.

The working fluid 310 flows into the gap G through the through holes 146 and 148, in accordance with some embodiments. The working fluid 310 improves the heat dissipation of the optical fibers 120, in accordance with some embodiments.

In some embodiments, an angle θ1 between an inner wall 146*a* of the through hole 146 and a longitudinal axis X120 of the optical fibers 120 is greater than about 0° and less than about 90°. In some embodiments, an angle θ2 between an inner wall 148*a* of the through hole 148 and the longitudinal axis X120 of the optical fiber 120 is greater than about 0° and less than about 90°. The inner wall 146*a* of the through hole 146 is not parallel to the inner wall 148*a* of the through hole 148, in accordance with some embodiments.

Processes and materials for forming the optical device structure 102 may be similar to, or the same as, those for forming the optical device structure 101 described above. Elements designated by the same or similar reference numbers as those in FIGS. 1A to 12 have the same or similar structures and the materials. Therefore, the detailed descriptions thereof will not be repeated herein.

In accordance with some embodiments, optical device structures and methods for forming the same are provided. The methods (for forming the optical device structure) form a fiber shield structure over optical fibers to prevent the optical fibers from being affected by a cooling system or a cooling fluid. Therefore, the lifetime, the stability, and the efficiency of the optical device structures are improved.

In accordance with some embodiments, a method for forming an optical device structure is provided. The method includes disposing a first end portion of an optical fiber into a fiber array unit structure. The first end portion penetrates through the fiber array unit structure. The method includes bonding the first end portion of the optical fiber to a co-packaged optical device. The method includes bonding a fiber shield structure to the fiber array unit structure and the co-packaged optical device after the first end portion is bonded to the co-packaged optical device. The fiber shield structure surrounds the optical fiber.

In accordance with some embodiments, a method for forming an optical device structure is provided. The method includes disposing an end portion of an optical fiber into a fiber array unit structure. The end portion penetrates through the fiber array unit structure, and a main portion of the optical fiber is not covered by the fiber array unit structure. The method includes bonding the optical fiber and the fiber array unit structure to a co-packaged optical device. The method includes bonding a fiber shield structure to the fiber array unit structure and the co-packaged optical device. The fiber shield structure covers the main portion of the optical fiber, the fiber shield structure has a first through hole, and the first through hole exposes a first part of the main portion of the optical fiber.

In accordance with some embodiments, an optical device structure is provided. The optical device structure includes a co-packaged optical device. The optical device structure includes a fiber array unit structure over the co-packaged optical device. The optical device structure includes an optical fiber passing through the fiber array unit structure and bonded to the co-packaged optical device, wherein a main portion of the optical fiber is not covered by the fiber array unit structure. The optical device structure includes a fiber shield structure covering the main portion of the optical fiber and bonded to the fiber array unit structure and the co-packaged optical device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an optical device structure, comprising:

disposing a first end portion of an optical fiber into a fiber array unit structure, wherein the first end portion penetrates through the fiber array unit structure;

bonding the first end portion of the optical fiber to a co-packaged optical device;

bonding a fiber shield structure to the fiber array unit structure and the co-packaged optical device after the first end portion is bonded to the co-packaged optical device, wherein the fiber shield structure surrounds the optical fiber, and there is a gap between the fiber shield structure and the optical fiber; and forming a thermal interface layer in the gap, wherein the thermal interface layer surrounds the optical fiber, and the thermal interface layer is in direct contact with the optical fiber and the fiber shield structure.

2. The method for forming the optical device structure as claimed in claim 1, wherein the fiber shield structure is bonded to the fiber array unit structure through an adhesive layer, and the adhesive layer is between the fiber shield structure and the fiber array unit structure after the fiber shield structure is bonded to the fiber array unit structure.

3. The method for forming the optical device structure as claimed in claim 2, wherein the adhesive layer is further between the fiber shield structure and the co-packaged optical device after the fiber shield structure is bonded to the co-packaged optical device.

4. The method for forming the optical device structure as claimed in claim 1, wherein the fiber shield structure is thicker than the optical fiber.

5. The method for forming the optical device structure as claimed in claim 1, further comprising:

bonding the co-packaged optical device to a wiring substrate after the fiber shield structure is bonded to the fiber array unit structure and the co-packaged optical device.

6. The method for forming the optical device structure as claimed in claim 1, wherein a first thermal conductivity of the thermal interface layer is greater than a second thermal conductivity of the optical fiber.

7. The method for forming the optical device structure as claimed in claim 6, wherein a third thermal conductivity of the fiber shield structure is greater than the first thermal conductivity of the thermal interface layer.

8. The method for forming the optical device structure as claimed in claim 1, wherein a first sidewall of a second end portion of the optical fiber is substantially level with a second sidewall of the fiber shield structure.

9. The method for forming the optical device structure as claimed in claim 1, wherein the fiber shield structure is wider than the fiber array unit structure.

10. The method for forming the optical device structure as claimed in claim 9, wherein the fiber shield structure covers a first portion of a top surface of the fiber array unit structure and a second portion of a sidewall of the fiber array unit structure.

11. A method for forming an optical device structure, comprising:

disposing an end portion of an optical fiber into a fiber array unit structure, wherein the end portion penetrates through the fiber array unit structure, and a main portion of the optical fiber is not covered by the fiber array unit structure;

bonding the optical fiber and the fiber array unit structure to a co-packaged optical device;

bonding a fiber shield structure to the fiber array unit structure and the co-packaged optical device, wherein the fiber shield structure covers the main portion of the optical fiber, and the optical fiber, the fiber array unit structure, the co-packaged optical device, and the fiber shield structure together form an optical device structure;

providing a housing and a cooling system, wherein at least a portion of the cooling system is in a chamber of the housing; and disposing the optical device structure into the chamber, wherein the fiber shield structure and the optical fiber penetrate through the housing.

12. The method for forming the optical device structure as claimed in claim 11, wherein the fiber shield structure has a first through hole, the first through hole exposes a first part of the main portion of the optical fiber, and an angle between a first inner wall of the first through hole and a longitudinal axis of the optical fiber is greater than about 0° and less than about 90°.

13. The method for forming the optical device structure as claimed in claim 12, wherein the fiber shield structure has a second through hole, the second through hole exposes a second part of the main portion of the optical fiber, and the first inner wall of the first through hole is not parallel to a second inner wall of the second through hole.

14. The method for forming the optical device structure as claimed in claim 11, wherein the fiber shield structure is narrower than the fiber array unit structure.

15. The method for forming the optical device structure as claimed in claim 11, wherein an outer wall of the fiber shield structure is connected to the housing.

16. The optical device structure as claimed in claim 15, wherein the cooling system is connected to the housing.

17. An optical device structure, comprising:

a co-packaged optical device;

a fiber array unit structure over the co-packaged optical device;

an optical fiber passing through the fiber array unit structure and bonded to the co-packaged optical device, wherein a main portion of the optical fiber is not covered by the fiber array unit structure;

a fiber shield structure covering the main portion of the optical fiber and bonded to the fiber array unit structure and the co-packaged optical device; and a thermal interface layer between the optical fiber and the fiber shield structure, wherein a first thermal conductivity of the thermal interface layer is greater than a second thermal conductivity of the optical fiber.

18. The optical device structure as claimed in claim 17, further comprising:

an adhesive layer bonded between the fiber shield structure and the fiber array unit structure.

19. The optical device structure as claimed in claim 18, wherein the adhesive layer is further bonded between the fiber shield structure and the co-packaged optical device.

20. The optical device structure as claimed in claim 17, wherein the fiber shield structure has a through hole, and the through hole exposes a part of the main portion of the optical fiber.

* * * * *